United States Patent
Jun et al.

(10) Patent No.: US 10,203,912 B2
(45) Date of Patent: Feb. 12, 2019

(54) STORAGE DEVICE FOR SUPPORTING VIRTUAL MACHINE, STORAGE SYSTEM INCLUDING THE STORAGE DEVICE, AND METHOD OF OPERATING THE SAME

(71) Applicant: SAMSUNG ELECTRONICS CO., LTD., Suwon-si (KR)

(72) Inventors: Byung-Hei Jun, Seoul (KR); Dong-Kun Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 112 days.

(21) Appl. No.: 15/217,270

(22) Filed: Jul. 22, 2016

(65) Prior Publication Data

US 2017/0024132 A1    Jan. 26, 2017

(30) Foreign Application Priority Data

Jul. 22, 2015 (KR) .................. 10-2015-0103853

(51) Int. Cl.
*G06F 3/06* (2006.01)

(52) U.S. Cl.
CPC .......... *G06F 3/0688* (2013.01); *G06F 3/0604* (2013.01); *G06F 3/0631* (2013.01)

(58) Field of Classification Search
CPC ......... G06F 9/45533; G06F 2009/4557; G06F 9/5083; G06F 2201/815; G06F 3/0631; G06F 3/0653; G06F 3/0688; G06F 3/0604; G06F 12/0238
See application file for complete search history.

(56) References Cited

U.S. PATENT DOCUMENTS

| | | | |
|---|---|---|---|
| 7,953,773 B2 | 5/2011 | Lindholm et al. | |
| 8,424,007 B1* | 4/2013 | Hernacki | G06F 9/485 |
| | | | 718/103 |
| 8,707,300 B2 | 4/2014 | Govindan et al. | |
| 8,799,554 B1 | 8/2014 | Vincent et al. | |
| 2011/0035753 A1* | 2/2011 | Palczak | G06F 11/3688 |
| | | | 718/104 |
| 2011/0154318 A1 | 6/2011 | Oshins et al. | |
| 2011/0225583 A1 | 9/2011 | Suh et al. | |
| 2012/0167082 A1 | 6/2012 | Kumar et al. | |
| 2013/0179881 A1 | 7/2013 | Calder et al. | |

(Continued)

FOREIGN PATENT DOCUMENTS

| | | |
|---|---|---|
| JP | 4935626 B2 | 5/2012 |
| JP | 4982578 B2 | 7/2012 |

(Continued)

OTHER PUBLICATIONS

Byunghei Jun et al., "WACSE: Workload Aware Compensation based Scheduler for PCI Express SSD", Mar. 12, 2015, Total 10 pages.

*Primary Examiner* — Hashem Farrokh
(74) *Attorney, Agent, or Firm* — Sughrue Mion, PLLC

(57) ABSTRACT

A storage device includes a non-volatile memory including a plurality of blocks; and a storage controller connected to the non-volatile memory and configured to schedule a requested task of one virtual machine of a plurality of virtual machines based on a workload contribution of the one virtual machine, the workload contribution indicating a ratio between a workload generated by the one virtual machine and a plurality of workloads generated by the plurality of virtual machines.

17 Claims, 14 Drawing Sheets

(56) References Cited

U.S. PATENT DOCUMENTS

| | | |
|---|---|---|
| 2013/0305246 A1 | 11/2013 | Goggin et al. |
| 2013/0326109 A1 | 12/2013 | Kivity |
| 2014/0137104 A1* | 5/2014 | Nelson ................ G06F 9/45558 718/1 |
| 2014/0282514 A1 | 9/2014 | Carson et al. |
| 2015/0052526 A1* | 2/2015 | Fujiwaka ............ G06F 11/3433 718/1 |
| 2016/0147687 A1* | 5/2016 | Check ....................... G06F 1/24 710/117 |
| 2016/0179381 A1* | 6/2016 | Paes ..................... G06F 3/0604 711/103 |

FOREIGN PATENT DOCUMENTS

| | | |
|---|---|---|
| JP | 5538310 B2 | 7/2014 |
| JP | 5563126 B1 | 7/2014 |
| JP | 5601516 B2 | 10/2014 |
| KR | 101502225 B1 | 3/2015 |

\* cited by examiner

STORAGE DEVICE FOR SUPPORTING VIRTUAL MACHINE, STORAGE SYSTEM INCLUDING THE STORAGE DEVICE, AND METHOD OF OPERATING THE SAME

This application claims priority from Korean Patent Application No. 10-2015-0103853, filed on Jul. 22, 2015, in the Korean Intellectual Property Office, the disclosure of which is incorporated herein in its entirety by reference.

BACKGROUND

1. Field

Apparatuses and methods consistent with exemplary embodiments relate to a storage device, and, more particularly, to a storage device for supporting virtual functions, a method of scheduling tasks of the storage device, and a storage system.

2. Description of the Related Art

An example of a data storage device based on a non-volatile memory device includes a solid state drive (SSD). As an interface used for a data storage device such as the SSD, serial advanced technology attachment (SATA), peripheral component interconnect express (PCIe), serial attached small computer system interface (SAS), or the like may be used. The performance of the SSD is gradually improved, and thus the amount of data to be processed by the SSD is increased. However, a conventional interface, such as an SATA, has a basic limitation because the conventional interface is not specialized in a data storage device such as the SSD. Consequently, to provide a standardized interface suitable for the SSD, a non-volatile memory express (NVMe) has been introduced. The NVMe is a register-level interface for communication between a data storage device, such as the SSD, and a host software. The NVMe is based on a conventional PCIe bus, and is an interface optimized for the SSD.

With the advance of a semiconductor manufacturing technology, the operating speed of a host device, such as a computer, a smart phone, or a smart pad, which communicates with a storage device, has been improved. Further, according to the improvement in the operation speed of a host device, the virtualization of a host device for driving various virtual functions has been introduced. However, the conventional NVMe has a limitation in supporting the virtual functions because the conventional NVMe cannot sufficiently ensure the isolation and fairness between virtual machines in the virtualization.

SUMMARY

One or more exemplary embodiments provide a storage device, a storage system including the storage device, and a method of virtualizing the storage device, in which virtual functions are supported while providing isolation and fairness between virtual machines in the virtualization.

According to an aspect of an exemplary embodiment, provided is a storage device including: a non-volatile memory including a plurality of blocks; and a storage controller connected to the non-volatile memory and configured to schedule a requested task of one virtual machine of a plurality of virtual machines based on a workload contribution of the one virtual machine, the workload contribution indicating a ratio between a workload generated by the one virtual machine and a plurality of workloads generated by the plurality of virtual machines.

The storage controller may independently assign erase block groups to the non-volatile memory, the erase block groups corresponding to the plurality of virtual machines, and the workload contribution of the one virtual machine may be determined based on a storage efficiency of storing valid data in an erase block group corresponding to the one virtual machine.

The storage efficiency of storing the valid data may be determined based on a ratio between a number of used pages and a number of pages in which the valid data are stored, with respect to the erase block group corresponding to the one virtual machine.

The storage controller may include: a plurality of request queues respectively corresponding to the plurality of virtual machines and configured to store requested tasks of the plurality of virtual machines; a task scheduler configured to schedule the requested tasks based on the workload contribution of each of the plurality of virtual machines; an address mapping manager configured to manage address mapping of data stored in the non-volatile memory; and a plurality of flash queues respectively connected to the non-volatile memory through a plurality of channels.

The storage controller may independently assign erase block groups to the non-volatile memory, the erase block groups corresponding to the plurality of virtual machines, and the workload contribution of the one virtual machine may be determined based on a storage efficiency of storing valid data in an erase block group corresponding to the one virtual machine.

The storage efficiency of storing the valid data in the erase block group may be determined based on a ratio between a number of used pages and a number of pages in which the valid data are stored, with respect to the erase block group.

According to an aspect of another exemplary embodiment, provided is a task scheduling method of a storage device, the storage device including a storage controller and a non-volatile memory connected to the storage controller, the task scheduling method including: assigning a request queue to one of a plurality of virtual machines; assigning a time budget to the request queue; storing tasks, requested by the one of the plurality of virtual machines, in the request queue; executing a first task stored in the request queue; reducing the time budget by a time cost of the executed first task in response to execution of the first task being completed, the time cost being determined based on a workload generated by the first task; and in response to the time budget of the request queue being exhausted, delaying executing a remaining task stored in the request queue until a second time budget is reassigned to the request queue.

The assigning the time budget may include assigning the same time budget to request queues respectively assigned to the plurality of virtual machines.

The executing the first task stored in the request queue may include fetching the stored first task from the request queue.

The executing the first task stored in the request queue may include receiving data associated with the stored first task from a host device and transmitting the received data to a flash queue included in the storage controller.

The transmitting may include transmitting the received data to the flash queue through a plurality of channels between the storage controller and the non-volatile memory.

The task scheduling method may further include determining the time cost of the executed first task based on a time interval from fetching the first task stored in the request queue to completion of the first task.

The task scheduling method may further include independently assigning an erase block group including at least one block included in the non-volatile memory, to each of the plurality of virtual machines.

The time cost may be determined based on a storage efficiency of storing data in the erase block group assigned to a corresponding virtual machine.

The storage efficiency may be determined based on a ratio between a number of used pages and a number of pages in which the valid data are stored, with respect to the erase block group.

The storage efficiency of the erase block group may be stored in a meta block group included in the non-volatile memory.

The storage efficiency of the erase block group may be stored in the erase block group.

The task scheduling method may further include compensating the time cost of the executed first task.

The compensating the time cost may include determining a time cost of an overhead; and compensating the time cost of the executed first task based on the determined time cost of the overhead.

The overhead may include an overhead caused by at least one of garbage collection, read reclaim, and mapping table upload.

According to an aspect of still another exemplary embodiment, provided is a storage controller in a storage device, the storage controller including: a virtual function manager, implemented by at least one hardware processor, configured to schedule requested tasks of a plurality of virtual machines by predicting a workload generated by a respective requested task; and a flash queue configured to temporarily store data, the data being input from or output to a non-volatile memory included in the storage device based on the scheduled requested tasks, wherein the workload is predicted based on a time taken to perform the respective requested task and an overhead caused by the respective requested task.

The storage controller may further include address mapping manager configured to manage address mapping of data that are stored in the non-volatile memory, and the data stored in the flash queue are input from or output to the non-volatile memory further based on the address mapping.

The storage controller may further include a plurality of request queues respectively corresponding to the plurality of virtual machines and configured to store the requested tasks of the plurality of virtual machines.

The virtual function manager may schedule the requested tasks of the plurality of virtual machines such that a first virtual machine having a relatively large predicted workload exhausts a resource assigned to the first virtual machine more quickly than a second virtual machine having a relatively small predicted workload.

In response to the resource assigned to the first virtual machine being exhausted, the virtual function manager may delay executing a remaining task of the first virtual machine until a new resource is reassigned to the first virtual machine.

The new resource may be reassigned in response to at least one of a resource assigned to the second virtual machine being exhausted and the second virtual machine not having a remaining task to be executed.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
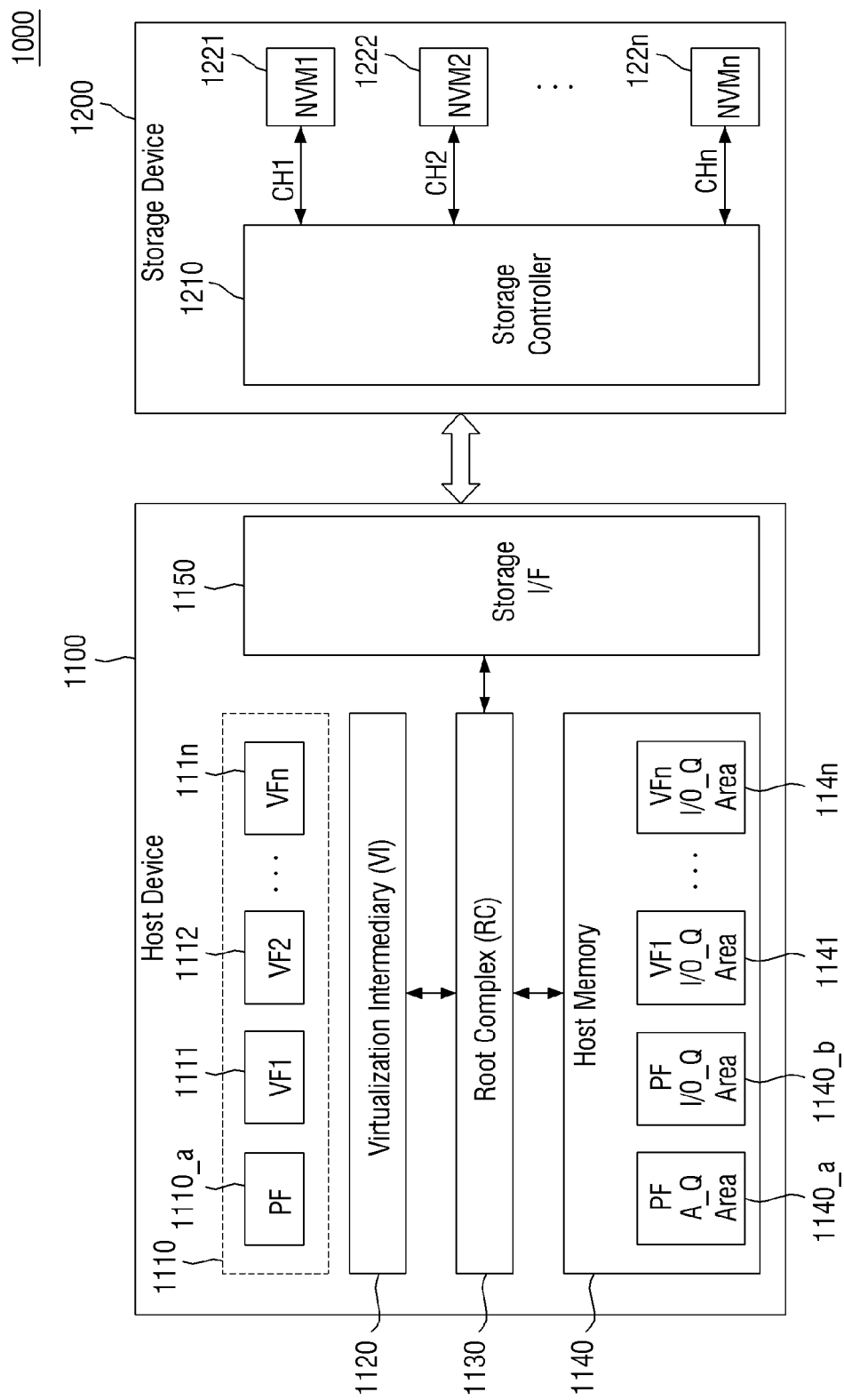
FIG. 1 is a block diagram showing a storage system according to an exemplary embodiment.

Certain exemplary embodiments will be described in detail with reference to the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. In the drawings, the thickness of layers and regions are exaggerated for clarity.

It will be understood that when an element or layer is referred to as being "on" or "connected to" another element or layer, it may be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

The storage system for supporting virtual functions and the storage device for supporting virtual functions according to exemplary embodiments of the inventive concept may provide a physical function (PF) for management and a plurality of virtual functions (VFs) to a host. In this case, at least one virtual function (VF) may be assigned to one virtual machine (VM).

FIG. 1 is a block diagram showing a storage system 1000 for supporting virtual functions according to an exemplary embodiment. The storage system 1000 of FIG. 1 may support a virtual function while supporting a queue-based command interface mode. For example, the storage system 1000 of FIG. 1 may support a virtual function of a single-root input/output (I/O) virtualization (SR-IOV) while supporting an interface mode according to a non-volatile memory express (NVMe) protocol. Referring to FIG. 1, the storage system 1000 may include a host device 1100 and a storage device 1200. The host device 1100 may include a host core 1110, a virtualization intermediary (VI) 1120, a root complex (RC) 1130, a host memory 1140, and a storage interface 1150.

The host core 1110 may include a physical function (PF) 1110_a and a plurality of virtual functions (VF1 to VFn) 1111 to 111n. Here, the physical function 1110_a may be a core or processor implemented by a physical hardware. The plurality of virtual functions 1111 to 111n may respectively be virtual cores or processors provided by virtualization operation of the SR-IOV and each of the plurality of virtual functions 1111 to 111n may independently drive an operating system and an application. The operating system driven by one virtual function may be referred to as "Guest O/S".

The virtualization intermediary 1120 is connected to the host core 1110 and the root complex 1130, and serves to execute the virtual functions 1111 to 111n or manage the virtual functions 1111 to 111n. For example, the virtualization intermediary 1120 may execute functions of transmitting and managing the information about the virtualization operation of the SR-IOV.

The root complex 1130 expresses the root of hierarchy, and is connected to the virtualization intermediary 1120, the host memory 1140, and the storage interface 1150. The root complex 1130 may serve to connect the host core 1110 to the host memory 1140 and connect the host core 1110 and the host memory 1140 to the storage interface 1150.

The host memory 1140 may be connected to the virtualization intermediary 1120, the host core 1110, and the storage interface 1150 through the root complex 1130. For example, the host memory 1140 may be used as a working memory associated with the physical function 1110_a or each of the virtual functions 1111 to 111n. In this case, the host memory 1140 may be loaded with an application program, a file system, a device driver, and the like.

For another example, the host memory 1140 may be used as a buffer for transmitting data to the storage device 1200 or temporarily storing the data received from the storage device 1200. For example, the host memory 1140 may be implemented as a volatile memory such as a static random access memory (SRAM) or a dynamic random access memory (DRAM) or may be implemented as a non-volatile memory such as a phase-change random access memory (PRAM), a magnetic random access memory (MRAM), a resistive random access memory (RRAM), or a ferroelectric random access memory (FRAM), or a combination thereof.

The storage interface 150 is connected to the root complex 1130, and provides communication between the host device 1100 and the storage device 1200. For example, the storage interface 1150 may provide queue-based commands and data to the storage device 1200 according to an NVMe protocol, and may receive the information and data about commands processed from the storage device 1200.

The storage device 1200 may store the data provided from the host device 1100, or may provide the stored data to the host device 1100. The storage device may include a storage controller 1210 and a plurality of non-volatile memories 1221 to 122n.

The storage controller 1210 may communicate with the host device 1100 through a queue-based interface mode. The storage controller 1210 may control the storage device 1200 such that data is stored in at least one of the plurality of non-volatile memories 1221 to 122n according to the commands received from the host device 1100. Further, the storage controller 1210 may control the storage device 1200 such that data stored in at least one of the plurality of non-volatile memories 1221 to 122n are transmitted to the host device 1100.

The plurality of non-volatile memories 1221 to 122n may be connected to the storage controller 1210 through corresponding channels CH1 to CHn.

The plurality of non-volatile memories 1221 to 122n may respectively store data and/or may read the stored data according to the control of the storage controller 1210.

Each of the plurality of non-volatile memories 1221 to 122n may be implemented as a non-volatile memory such as a flash memory, a PRAM, an MRAM, or an FRAMA, or may be implemented as a combination thereof.

In an exemplary embodiment, the host memory 1140 may provide a queue command storage area for supporting virtual functions while supporting a queue-based interface mode. In other words, the host memory 1140 according to an exemplary embodiment may additionally provide a queue command storage area for supporting a queue-based command interface mode having virtual functions.

For example, as shown in FIG. 1, to support the virtual functions of the SR-IOV in the NVMe protocol interface, the host memory 1140 may provide a physical function administration queue storage area (PF A_Q Area) 1140_a in which the administration queue of the physical function 1110_a is stored, a physical function input/output queue storage area (PF I/O_Q Area) 1140_b in which the input/output queue of the physical function 1110_a is stored, and a plurality of virtual function input/output queue storage areas (VF1 I/O_Q Area to VFn I/O_Q Area) 1141 to 114n in which the input/output queues of the virtual functions are stored. In this case, the queue commands may be stored in their respective storage areas using a circular queue mode generally used in the NVMe protocol interface mode.

Figure 2:
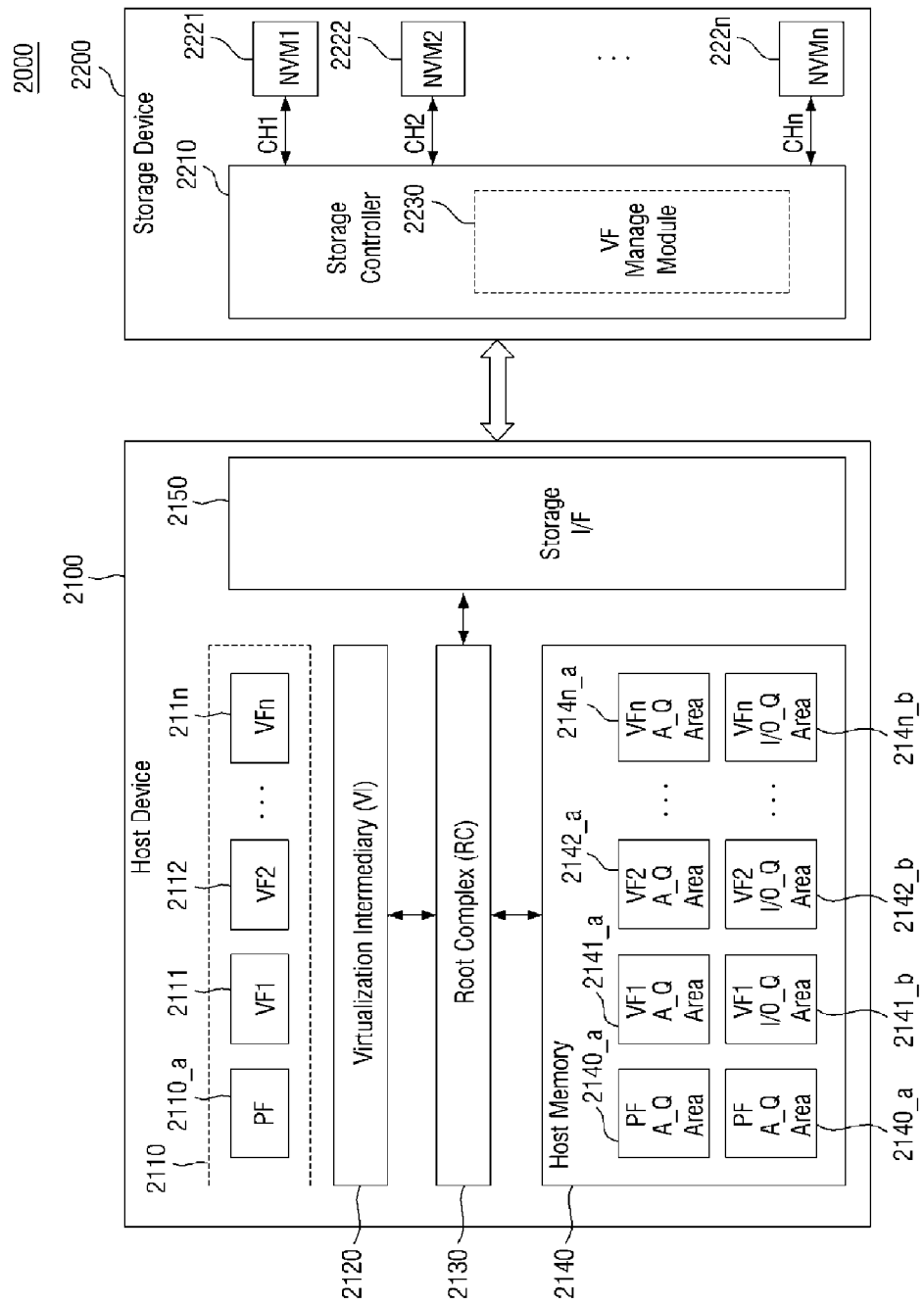
FIG. 2 is a block diagram showing a storage system according to another exemplary embodiment.

The guest O/S or virtualization intermediary 1120 of each of the virtual functions 1111 to 111*n* of the storage system 1000 of FIG. 2 may access the administration queue of the physical function 1110_a stored in the physical function administration queue storage area 1140_a every time the input/output queues (or VF1 I/O_Queue to VFn I/O_Queue) of the virtual functions 1111 to 111*n* are processed.

FIG. 2 is a block diagram showing a storage system 2000 for supporting virtual functions according to another exemplary embodiment. The configuration of the storage system 2000 of FIG. 2 is partially similar to the configuration of the storage system 1000 of FIG. 1. Therefore, the difference between the storage system 2000 of FIG. 2 and the storage system 1000 of FIG. 1 will be mainly described. Referring to FIG. 2, the storage system 2000 may include a host device 2100 and a storage device 2200.

The host device 2100 may include a host core 2110, a virtualization intermediary 2120, a root complex 2130, a host memory 2140, and a storage interface 2150. Since the configurations and operations of the host core 2110, the virtualization intermediary 2120, the root complex 2130, the host memory 2140, and the storage interface 2150 are similar to those described with reference to FIG. 1, detailed descriptions thereof will be omitted.

In another exemplary embodiment, independent separate administration queues may be respectively assigned to the plurality of virtual functions (VF1 to VFn) 2111 to 211*n* of FIG. 2. That is, independent virtual function administration queues (or VF1 administration queue to VFn administration queue) are respectively assigned to the plurality of virtual functions 2111 to 211*n*. Therefore, each of the plurality of virtual functions 2111 to 211*n* may independently perform the operations of queue management and command and/or data transaction using the corresponding virtual function administration queue.

For example, a first virtual function administration queue (or VF1 Administration queue) is assigned to the guest O/S of the first virtual function 2111, and the first virtual function 2111 may independently perform the operations of queue management and command and/or data transaction using the first virtual function administration queue stored in the first virtual function administration queue area 2141_a of the host memory 2140 and the plurality of virtual function input/output queues stored in the first virtual function input/output queue area 2141_b of the host memory 2140.

In this case, the virtualization intermediary 2120 does not need to intervene in the overall virtual operation. For example, since the virtualization intermediary 2120 is involved only in the SR-IOV capability initialization through the physical function 2110_a, the performance of the storage system may be improved.

To store the virtual function administration queues corresponding to the plurality virtual functions 2111 to 211*n*, the host memory 2140 may provide an area in which queue pairs of administration queues and input/output queues are stored. The host memory 2140 of FIG. 2 may additionally provide a plurality of virtual function administration areas (VF1 A_Q Area to VFn A_Q Area) 2141_a to 214*n*_a In this case, the virtual function administration queues and the virtual function input/output queues may be respectively stored in the host memory 2140 in the form of a circular queue.

Subsequently, referring to FIG. 2, the storage device 2200 may include a storage controller 2210 and a plurality of non-volatile memories 2221 to 222*n*. Since the overall configuration and operation of the storage device 2200 is similar to those in FIG. 1, detailed descriptions thereof will be omitted.

In some exemplary embodiment, the storage controller 2210 includes a virtual function (VF) manage module 2230. The virtual function manage module 2230 serves to store and process the virtual function administration queues and virtual function input/output queues corresponding to the plurality of virtual functions 2111 to 211*n*. The virtual function manage module 2230 may further include a task scheduler and an address mapping manager. The configuration and operation of the storage controller 2210 will be described later in more detail with reference to FIG. 4.

Each of the storage systems 1000 and 2000 of FIGS. 1 and 2 may be implemented as a server, a super computer, a personal computer, a laptop computer, a mobile phone, a smart phone, a tablet person computer (tablet PC), or a wearable computer.

As described above, the storage system 2000 according to another exemplary embodiment may support virtual functions while supporting a queue-based command interface mode.

Figure 3:
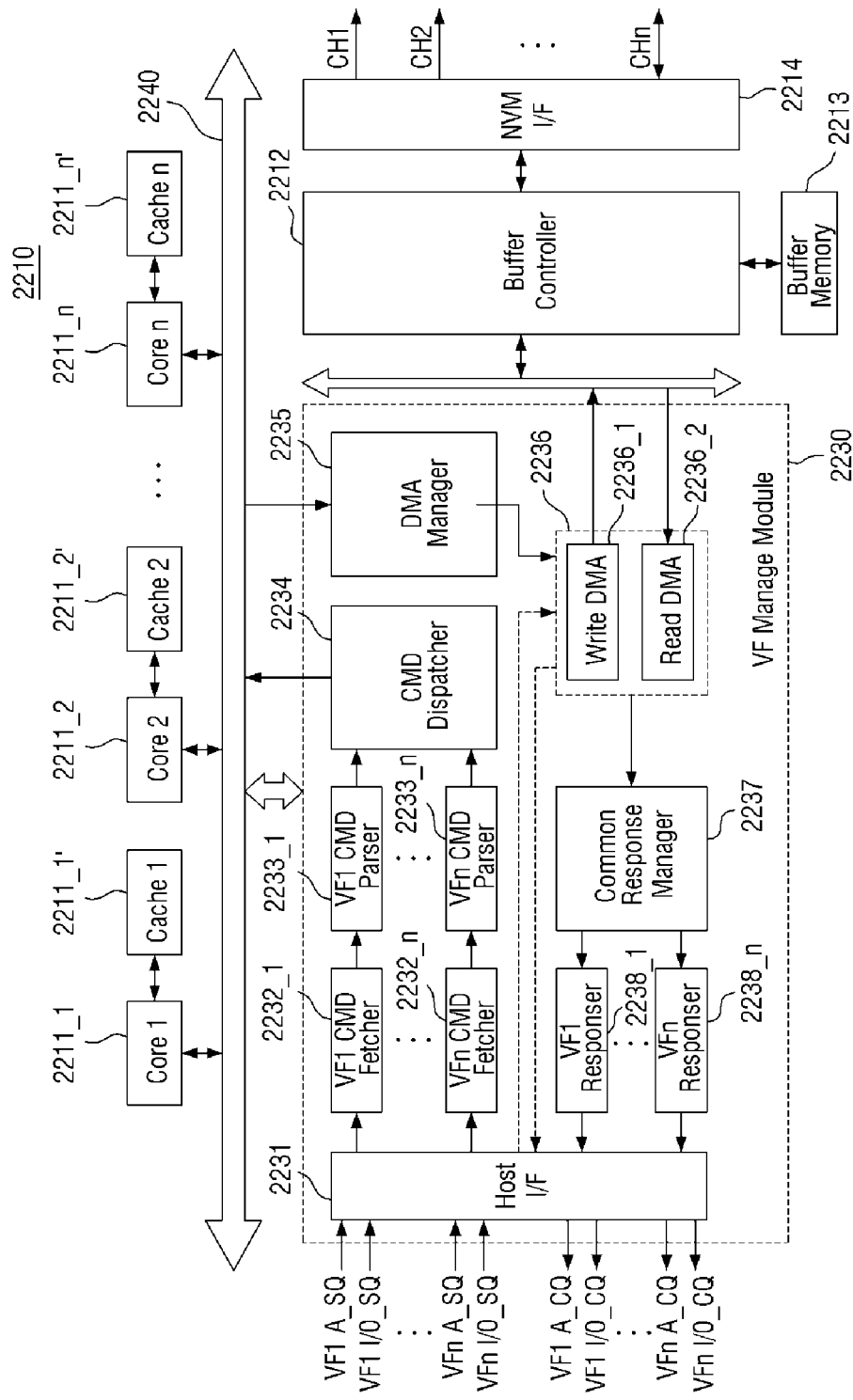
FIG. 3 is a block diagram showing configurations and operations of a storage controller and a virtual function manage module of FIG. 2 in more detail.

FIG. 3 is a block diagram showing the configurations and operations of the storage controller 2210 and the virtual function manage module 2230 of FIG. 2 in more detail. Referring to FIG. 3, the storage controller 2210 may include the virtual function manage module 2230, a plurality of cores 2211_1 to 2211_n, a plurality of caches 2211_1' to 2211_n ', and a non-volatile memory interface 2214.

In some exemplary embodiment, the virtual function manage module 2230 may be implemented to execute the operations of storing and processing the virtual functions received from the host device 2100 of FIG. 2 or storing and processing the plurality of administration queues and the plurality of input/output queues corresponding to the virtual machines. The virtual function manage module 2230 may include a host interface 2231, a plurality of virtual function command fetchers 2232_1 to 2232_n, a plurality of virtual function command parsers 2233_1 to 2233_n, a command dispatcher 2234, a direct memory access (DMA) manager 2235, a DMA unit 2236, a common response manager 2237, and a plurality of virtual function responsers 2238_1 to 2238_n.

The host interface 2231 supports the interfacing operation between the host device 2100 (refer to FIG. 2) and the storage device 2200. For example, as shown in FIG. 3, information about $n_{th}$ virtual function administration submission queue (VFn A_SQ) and $n_{th}$ virtual function input/output submission queue (VFn I/O_SQ) corresponding to the $n_{th}$ virtual function (VFn) may be transmitted from the host device 2100 to the storage device 2200 through the host interface 2231. In this case, management information corresponding to the $n_{th}$ virtual function may be included in the $n_{th}$ virtual function administration submission queue (VFn A_SQ), and information about read and write operations corresponding to the $n_{th}$ virtual function may be included in the $n_{th}$ virtual function input/output submission queue (VFn I/O_SQ).

Further, for example, information about $n_{th}$ virtual function administration completion queue (VFn A_CQ) and $n_{th}$ virtual function input/output completion queue (VFn I/O_CQ) corresponding to the $n_{th}$ virtual function (VFn) may be transmitted from the storage device 2200 to the host device 2100 through the host interface 2231. In this case, response information corresponding to the processing results of the $n_{th}$ virtual function administration submission queue (VFn A_SQ) may be included in the $n_{th}$ virtual function administration completion queue (VFn A_CQ), and response information corresponding to the processing results of the $n_{th}$ virtual function input/output submission queue (VFn I/O_SQ) may be included in the $n_{th}$ virtual function input/output completion queue (VFn I/O_CQ).

The first to $n_{th}$ virtual function command fetchers 2232_1 to 2232_n respectively correspond to information about the first to $n_{th}$ virtual function submission queues, and support the operation of fetching the commands stored in the corresponding submission queues. For example, the first virtual function command fetcher (VF1 CMD Fetcher) 2232_1 corresponds to information about the first virtual function administration submission queue (VF1 A_SQ) and the first virtual function input/output submission queue (VF1 I/O_SQ), and executes the operation of fetching the information about the first virtual function administration submission queue (VF1 A_SQ) and the first virtual function input/output submission queue (VF1 I/O_SQ) in response to a ring doorbell signal.

For example, the first virtual function or the first virtual machine may transmit a write or read task queue from/to the host device 1100 or 2100 to/from the storage device 1200 or 2200, and the corresponding task may be stored in the first virtual function command fetcher 2232_1. In this case, the first virtual function command parser 2233_1 may interpret the command (that is, requested task) stored in the first virtual function command parser 2233 1 to determine whether the command is a read or write task. If the command is a write task, the storage controller 2210 may transmit the data of the host device 2100 to buffer memory 2213 through a write DMA 2236_1 with reference to address information transmitted together with the command. Further, if the command is a read task, the storage controller 2210 may transmit data from the non-volatile memories 2221 to 222n to the host device 2100 through a read DMA 2236_2 with reference to address information transmitted together with the command. The first to $n_{th}$ virtual function command fetchers 2232_1 to 2232_n may respectively correspond to a request queue 2290 to be described later with reference to FIG. 4 and subsequent drawings. The method of scheduling a task using the request queue 2290 will be described later in detail with reference to FIG. 4 and subsequent drawings.

The fetching operation according to an exemplary embodiment is explained in more detail. For example, when information about the submission queue is input to the first virtual function administration queue area (VF1 A_Q Area) 2141_a of the host memory 2140 (refer to FIG. 2), the host device 2100 transmits the ring doorbell signal to the storage controller 2210. In this case, the first virtual function command fetcher 2232_1 accesses the first virtual function administration queue area 2141_a in response to the ring doorbell signal, and temporarily stores the command information of the first virtual function administration submission queue (VF1 A_SQ) in the memory in the first virtual function command fetcher 2232_1.

Similarly, when information about the submission queue is input to the first virtual function input/output queue area (VF1 I/O_Q Area) 2141_b of the host memory 2140, the host device 2100 transmits the ring doorbell signal to the storage controller 2210. Thereafter, the first virtual function command fetcher 2232_1 accesses the first virtual function input/output queue area 2141_b in response to the ring doorbell signal, and temporarily stores the command information of the first virtual function input/output submission queue (VF1 I/O_SQ) in the memory in the first virtual function command fetcher 2232_1.

The virtual function command fetchers 2232_1 to 2232_n may be implemented as a plurality of registers or a volatile memory, such as an SRAM or a DRAM, and may be implemented as a non-volatile memory, such as a PRAM, an MRAM, an RRAM, or an FRAM, or a combination thereof.

The first to $n_{th}$ virtual function command parsers 2233_1 to 2233_n are respectively connected to the first to $n_{th}$ virtual function command fetchers 2232_1 to 2232_n. The first to $n_{th}$ virtual function command parsers 2233_1 to 2233_n respectively receive the commands for administration submission queues or input/output submission queues from the first to $n_{th}$ virtual function command fetchers 2232_1 to 2232_n, and execute the operation of parsing the characteristics of each of the commands. For example, the first virtual function command parser 2233_1 receives a command from the first virtual function command fetcher 2232_1, and executes the operation of analyzing the characteristics of the received command, the content corresponding to the command, or the like.

The command dispatcher 2234 is commonly connected to the first to $n_{th}$ virtual function command parsers 2233_1 to 2233_n. The command dispatcher 2234 receives the plurality of commands parsed from the first to $n_{th}$ virtual function command parsers 2233_1 to 2233_n, and executes the operation of appropriately distributing the commands to the plurality of cores 2211_1 to 2211_n in accordance with the characteristics thereof. For example, the command dispatcher 2234 may distribute the commands such that the plurality of cores 2211_1 to 2211_n are operated in parallel to each other.

The plurality of cores 2211_1 to 2211_n are respectively connected to the command dispatcher 2234 through the bus 2240, and receive commands from the command dispatcher 2234. Further, the plurality of the cores 2211_1 to 2211_n are respectively connected to a plurality of cache memories 2211_1' to 2211_n', and execute the operation of adjusting the commands with reference to the instructions stored in the respective corresponding caches memories. For example, when the receive command and the data corresponding to this command exceed the data capacity that may be processed by the DMA unit 2236 at one time, the corresponding core executes the operation of appropriately adjusting the command with reference to the instruction stored in the corresponding cache memory such that this command may be processed in the DMA unit 2236. For example, the data capacity that may be processed by the DMA unit 2236 may be the page unit (for example, 4 Kbytes) of the non-volatile memories 2221 to 222n. If the data corresponding to the receive command exceeds the data capacity, the data may be divided to have an appropriate size (for example, 4 KB), and then the divided data are transmitted.

The DMA manager 2235 receives commands (for example, adjusted commands) from the cores 2211_1 to 2211_n, and controls the DMA unit 2236 according to the received commands.

The DMA unit 2236 may include the write DMA 2236_1 and the read DMA 2236_2, and may control a data write operation and a data read operation according to the control of the DMA manager 2235. For example, when a write operation is executed according to the control of the DMA manager 2235, the write DMA 2236_1 receives data through the host interface 2231, and may control the storage device 2200 such that the received data is stored in any one of the plurality of non-volatile memories 2221 to 222n. For another example, when a read operation is executed according to the control of the DMA manager 2235, the read DMA 2236_2 executes the read operation on any one the plurality of non-volatile memories 2221 to 222n, and provides the read data to the host device 2100 through the host interface 2231.

The common response manager 2237 is connected to the DMA unit 2236, and receives response information about each command. For example, when the first to $n_{th}$ virtual function input/output submission queues (VF1 I/O_SQ~VFn I/O SQ) are respectively write commands for first to $n_{th}$ data, the common response manager 2237 receives information about results of a write operation of the first to $n_{th}$ data (for example, information about write fail, and the like) from the DMA unit 2236.

In this case, response information about the processing result of the first virtual function administration submission queue (VF1 A_SQ) may correspond to the first virtual function administration completion queue (VF1 A_CQ), and response information about the processing result of the first virtual function input/output submission queue (VF1 I/O_SQ) may correspond to the first virtual function input/output completion queue (VF1 I/O_CQ). Similarly, response information about the processing result of the $n_{th}$ virtual function administration submission queue (VFn A_SQ) may correspond to the $n_{th}$ virtual function administration completion queue (VFn A_CQ), and response information about the processing result of the $n_{th}$ virtual function input/output submission queue (VFn I/O_SQ) may correspond to the $n_{th}$ virtual function input/output completion queue (VFn I/O_CQ).

Further, the common response manager 2237 executes the operation of distributing the collected information to the first to $n_{th}$ virtual function reponsers 2238_1 to 2238_n. For example, the common response manager 2237 contributes the information about the first virtual function administration completion queue (VF1 A_CQ) and the first virtual function input/output completion queue (VF1 I/O_CQ) to the first virtual function responser 2238_1, and contributes the information about the $n_{th}$ virtual function administration completion queue (VFn A_CQ) and the $n_{th}$ virtual function input/output completion queue (VFn I/O_CQ) to the $n_{th}$ virtual function responser 2238_n.

The first to $n_{th}$ virtual function reponsers 2238_1 to 2238_n are commonly connected to the common response manager 2237, and receives information about the corresponding virtual function administration completion queue (VF A_CQ) and virtual function input/output completion queue (VF I/O_CQ). The first to $n_{th}$ virtual function reponsers 2238_1 to 2238_n record the information about the received completion queues in the host memory 2140.

For example, the first virtual function responser 2238_1 may record the information about the first virtual function administration completion queue (VF1 A_CQ) and the information about the first virtual function input/output completion queue (VF1 I/O_CQ) in the first virtual function administration queue area 2141_a and the first virtual function input/output queue area 2141_b of the host memory 2140, respectively. For another example, the $n_{th}$ virtual function responser 2238_n may record the information about the $n_{th}$ virtual function administration completion queue (VFn A_CQ) and the information about the $n_{th}$ virtual function input/output completion queue (VFn I/O_CQ) in the $n_{th}$ virtual function administration queue area 214n_a and the $n_{th}$ virtual function input/output queue area 214n_b of the host memory 2140, respectively.

Further, each of the first to $n_{th}$ virtual function reponsers 2238_1 to 2238_n finishes the operation of recording the completion queue to generate an interrupt signal, and notifies the interrupt signal to the host device 2100. In this case, the host device 2100 checks the information about the processing result in the host memory 2140 in response to the interrupt signal, and processes the information.

Subsequently, referring to FIG. 3, the buffer controller 2212 is connected to the virtual function manage module 2230 and the buffer memory 2231. The buffer controller 2212 executes the operation of controlling the buffer memory 2213 to perform a read operation or a write operation in response to the control of the DMA unit 2236.

In the read operation or write operation, the buffer memory 2213 serves as a buffer in which read data or write data are temporarily stored. For example, the buffer memory 2213 may be implemented as a plurality of registers or a volatile memory, such as an SRAM or a DRAM, and may be implemented as a non-volatile memory, such as a PRAM, an MRAM, an RRAM, or an FRAM, or a combination thereof.

The non-volatile memory interface (NVM I/F) 2214 is connected to the non-volatile memories 2221 to 222n through a plurality of channels CH1 to CHn, and provides interfacing between the storage controller 2210 and the non-volatile memories 2221 to 222n.

As described above, the storage controller 2210 according to an exemplary embodiment may include a plurality of request queues (the plurality of virtual function command fetchers 2232_1 to 2232_n) supporting the function of storing and processing the administration queue and input/output queue corresponding to each virtual function such that the plurality of virtual functions 2111 to 211n and the plurality of virtual machines of the host device 2100 are independently driven. Moreover, the virtual function manage module 2230 according to an exemplary embodiment may be configured to independently execute a fetching operation, a parsing operation, and a responding operation with respect to each virtual function such that operations corresponding to respective virtual functions are processed in parallel to each other in the storage device 2200. In addition, the storage device 2200 according to an exemplary embodiment may include the plurality of cores 2211_1 to 2211_n to effectively support the parallel processing of the operation required for each virtual function.

Consequently, the storage device 2200 according to an exemplary embodiment may support virtual functions while supporting a queue-based command interface mode, and may process the requests of a host more rapidly. Further, the storage controller 2210 may separate the performance of each virtual function or virtual machine through a task scheduler in the storage controller 2210, and may control the fair usage of resources in the storage device 2200.

The foregoing description will be understood to be illustrative, and exemplary embodiments are not limited thereto. For example, the storage systems 1000 and 2000 shown in FIGS. 1 to 3 have been described to support SR-IOV type virtual functions or virtual machines. However, these are illustrative, and the storage system 200 of exemplary embodiments may be applied to MR-IOV type virtual functions or virtual machines. Further, the storage system 200 shown in FIGS. 1 to 3 has been described to support an interface mode according to an NVMe protocol. However, this is illustrative, and the storage system of exemplary embodiments may be applied to a mode based on a peripheral component interconnect express (PCIe) interface, for example, a PCIe architecture queueing interface (PQI) mode or a PQI/NVMe mode. Moreover, in FIGS. 1 to 3, it has been described that independent virtual function administration queues are assigned to all of the plurality of virtual functions. However, this is illustrative, and virtual function administration queues may be assigned to at least one of the plurality of virtual functions.

Figure 4:
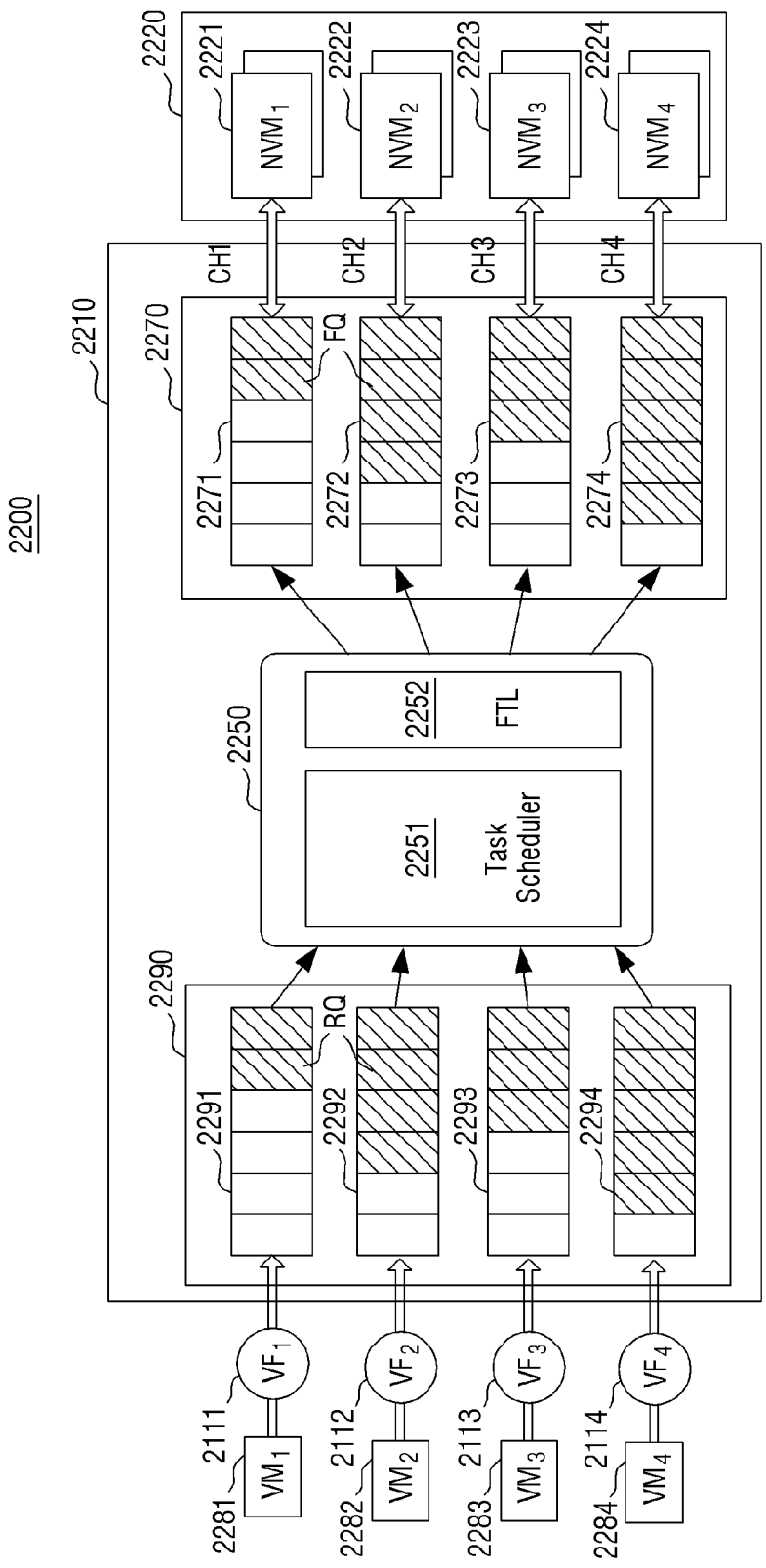
FIG. 4 is a block diagram of a storage device according to an exemplary embodiment.

FIG. 4 is a block diagram of a storage device supporting virtual functions.

Referring to FIGS. 1 to 4, the storage device 2200 may include a storage controller 2210 including at least one request queue, a virtual function manage module (or virtual function manager) 2250, and at least one flash queue; and a non-volatile memory 2220.

The virtual function manage module 2250 may include a task scheduler 2251 and an address mapping manager (FTL) 2252. The task scheduler 2251 is connected to the request queue 2290, and schedules the stored request task according to a scheduling algorithm. The address mapping manager (FTL) 2252 manages address mapping information about the data stored in the non-volatile memory 2220 in relation to the request task processed according to the result of the scheduling. A flash queue 2270 is connected to the non-volatile memory 2220 through a plurality of channels CH1 to CHn, and temporarily stores the data input to or output from the specified non-volatile memory 2220 based on the scheduling algorithm and the address mapping information. The flash queue 2270 may include a plurality of queues 2271 to 2274 respectively corresponding to the plurality of channels CH1 to CHn.

The storage device 2200 supporting virtual functions according to exemplary embodiments may provide a physical function (PF) for management and a plurality of virtual functions (VFs) to the host device 1100 of FIG. 1 or 2100 of FIG. 2. In this case, at least one virtual function may be assigned to one virtual machine (VM). For example, the first virtual function 2111 may be assigned to the first virtual machine 2281, and the second virtual function 2112 and the third virtual function 2113 may be assigned to the second virtual machine 2282. The third virtual function 2114 may be assigned to the third virtual machine 2284.

The virtual functions 2111 to 2114 may have their own interrupt and memory areas in the host device 1100 or 2100, and the virtual machines 2281 to 2284 may directly communicate with the virtual functions 2111 to 2114. The storage device 2200 may assign independent request queues 2291 to 2294 to each of the virtual functions 2111 to 2114 or each of the virtual machines 2281 to 2284. The request queues 2291 to 2294 of FIG. 4 may correspond to one of the first to $n_{th}$ virtual function command fetchers 2232_1 to 2232_n shown in FIG. 3. The operation of the virtual machines 2281 to 2284 may be managed by the host device 1100 or 2100. The virtual machines 2281 to 2284 may transmit task requests to the storage device 2200 through the virtual functions 2111 to 2114 assigned thereto. The transmitted task requests are stored in the corresponding request queues 2291 to 2294.

In the embodiment of FIG. 4, the virtual function manage module 2250 may correspond to the virtual function manage module 2230 of FIG. 3. In FIG. 4, it is shown that the request queue 2290 and the flash queue 2270 are separated from the virtual function manage module 2250. However, exemplary embodiments are not limited thereto, and the virtual function manage module 2250 may include at least one of the request queue 2290 and the flash queue 2270. Further, the request queue 2290 may be implemented as a separate memory outside the storage controller 2210.

The request queue 2290 may be connected between the host device 1100 or 2100 and the task scheduler 2251. The request queue 2290 may store at least one request task received from the host device 1100 or 2100. For example, the request task may be a write or read task of each of the virtual machines 2281 to 2284, the write or read task being received from the host device 2100 or 2100. The request queue 2290 may be a volatile memory or a non-volatile memory. The volatile memory may be one of an SRAM, a DRAM, a latch, and a register. The non-volatile memory may be one of a PRAM, an RRMA, an MRAM, and an FRAM. In this case, the storage device 2200 may include a register to manage a read pointer, a write pointer, and/or a base address with respect to each of the request queues 2291 to 2294.

The request queue 2290 receives a command (that is, request task) from the host device 2100. For example, as described with reference to FIGS. 1 to 3, when information about submission queues is input to the first virtual function input/output queue area (VF1 I/O_Q Area) 2141_b of the host memory 1140 or 2140, the host device 2100 transmits the ring doorbell signal to the virtual function manage module 2250. Thereafter, the first virtual function command fetcher 2232_1 accesses the first virtual function input/output queue area 2141_b in response to the ring doorbell signal, and temporarily stores the command of the first virtual function input/output submission queue (VF1 I/O_SQ) in the first request queue 2291_1. Similarly, the request tasks (or commands) respectively corresponding to the virtual machines 2281 to 2284 or the virtual functions 2111 to 2114 may be respectively stored in the plurality of request queues 2291 to 2294.

In the above exemplary embodiments, it has been described that each of the virtual machines 2281 to 2284 has one of the virtual functions 2111 to 2114. However, exemplary embodiments are not limited thereto, and one virtual machine may have a plurality of virtual functions. The stored request tasks may be interpreted by the virtual function command parsers 2233_1 to 2233_n, and the interpreted request tasks may be scheduled by the task scheduler 2251 to assure the independent performance of each of the virtual machines 2281 to 2284 and to fairly distribute the resources of the storage device 2200. In this case, in the storage device 2200, the stored request tasks may be scheduled according to the workload contribution thereof. The workload contribution will be described in detail with reference to FIG. 6 and subsequent drawings.

The task scheduler 2251 according to exemplary embodiments may fairly schedule the request tasks stored in the task queues using a workload aware budget compensation (WA-BC) manner. According to the WA-BC manner, each of the virtual machines 2281 to 2284 may schedule the request tasks by determining a time budget and a time cost of the virtual machines 2281 to 2284 according to the workload contribution thereof in the storage device 2200. Here, the workload means the amount of task to be processed by a computer system. In a multi-core system, the workload means the amount of task to be processed by a core. The workload contribution according to an exemplary embodiment may mean a relative generation rate of a workload when a plurality of virtual machines generates a plurality of workloads (e.g., a generation rate of a workload with respect to a plurality of workloads generated by the plurality of virtual machines). The workload may include the read or write operation by the request task of the virtual machine and additional operations (for example, overhead such as garbage collection or read reclaim). The scheduling method using the WA-BC manner will be described in detail with reference to FIGS. 6 to 10.

The virtual function manage module 2250 may be connected between the request queue 2290 and the flash queue

2270. The virtual function manage module 2250 may include the task scheduler 2251. In this case, the task scheduler 2251 may correspond to the command dispatcher 2234 of FIG. 3 and/or one of the cores 2211_1 to 2211_n of FIG. 3. The task scheduler 2251 executes the scheduling such that the request queue 2290 efficiently communicates with the flash queue 2270. For example, the task scheduler 2251 fetches the first request task (RQ) waiting in the request queue 2290, and transmits the fetched first request task (RQ) to at least one of the cores 2211_1 to 2211_n. The cores 2211_1 to 2211_n that receive the first request task (RQ) transmit data from the host device 2100 to the flash queue 2270 through the DMA unit (for example, DMA unit 2236 of FIG. 3) according to the received first request task (RQ).

Referring to FIG. 4 again, the virtual function manage module 2250 may include an address mapping manager, that is, a flash translation layer (FTL) 2252. The task scheduler 2251 checks the kind of the request tasks stored in the request queue 2290, and transmits a target address to the address mapping manager 2252. For example, when the request task stored in the first request queue 2291 is a write command, a write target address transmitted together with the write command is transmitted to the address mapping manager 2252. In this case, the write target address may be a logical address.

The address mapping manager 2252 may convert the received logical address into a physical address using a mapping table based on an address converting algorithm. The physical address may be transmitted to the flash queue 2270. In this case, the flash queue 2270 may store the data received from the host device 1100 or 2100 based on the task command checked by the task scheduler 2251 and the physical address received from the address mapping manager 2252. The mapping table may be managed by one of the cores 2211_1 to 2211_n.

The flash queue 2270 may be provided corresponding to a plurality of flash channels CH1 to CH4. The plurality of flash queues 2271 to 2274 may be connected to the plurality of non-volatile memories 2221 to 2224 through the plurality of flash channels CH1 to CH4. When the data transmitted from the host device 1100 or 2100 are stored in the plurality of flash queues 2271 to 2274, the data may be stored in the non-volatile memories 2221 to 2224 through one of flash channels (e.g., any one of CH1 to CH4) or the plurality of flash channels CH1 to CH4. For example, the data associated with the first virtual machine 2281 and the second virtual machine 2282 may be respectively assigned to the first flash channel CH1 and the second flash channel CH2. In another exemplary embodiment, all of the first data associated with the first virtual machine 2281 and the second data associated with the second virtual machine 2282 may be assigned to the first flash channel CH1. In still another exemplary embodiment, the first data associated with the first virtual machine 2281 may be distributed and assigned to the first flash channel CH1 and the second flash channel CH2. In this case, the data assigned to the flash channels different from each other may be simultaneously processed (e.g., written or read). That is, the virtual machine (VM) and the flash queue 2270 may be mapped with each other at a ratio of 1:1, 1:n, or n:1.

When the task scheduler 2252 executes the scheduling of the request tasks (RQ) of the virtual machines 2281 to 2284, the address mapping manager 2252 may assign an independent block group to each of the non-volatile memories 2221 to 2224 with respect to each of the virtual machines 2281 to 2284. For example, the independent block group may be an erase block group (EBG). The method of assigning the erase block group (EBG) will be described in detail with reference to FIG. 6.

The basic unit of write and read in the non-volatile memories 2221 to 2224 may be a page unit of a non-volatile memory. For example, the page unit may be a page unit of a NAND flash memory, and the page unit thereof may be 4 KB. Therefore, when the task scheduler 2251 executes the scheduling of the request task (RQ) stored in the request queue 2290, the unit of the scheduling may be the page unit. That is, when the request task of the host device 2210 is write data of 8 KB, the controller may execute the scheduling to perform page transmitting tasks two times at a unit of 4 KB. The unit of the scheduling may be changed depending on the page unit of the non-volatile memories 2221 to 2224.

In some exemplary embodiments, the task scheduler 2251 and/or the address mapping manager 2252 may be implemented as hardware or software. For example, the task scheduler 2251 may be configured as a hardware block associated with the command dispatcher 2234 of FIG. 3, and the address mapping manager 2252 may be configured as a hardware block associated with the buffer controller 2212 of FIG. 3. Further, the task scheduler 2251 and/or the address mapping manager 2252 may be implemented as software executed by one of the cores 2211_1 to 2211_n. This software is stored in the non-volatile memory 2220, and may be loaded in at least one of the cache memories 2211_1' to 2211_n' through the bus of FIG. 3 when power is applied to the storage device 2200.

The task scheduler 2251 may include the request queue 2290, the virtual function command parsers 2233_1 to 2233_n, the plurality of cores 2211_1 to 2211_n, and the flash queue 2270. For example, to schedule the first request task (RQ) stored in the request queue 2290, the request tasks stored in the plurality of request queues 2291 to 2294 are analyzed by the virtual function command parsers 2233_1 to 2233_n, and the analyzed commands are distributed to at least one of the cores 2211_1 to 2211_n by the command dispatcher 2234. Among the plurality of cores 2211_1 to 2211_n, the core that processes the parsed command is configured such that the second request task (FQ) for controlling the non-volatile memory 2220 according to the characteristics of the received command and the operation corresponding to the command is stored in the flash queue 2270. Some of the plurality of cores 2211_1 to 2211_n or the buffer controller 2212 may control the write, read and erase operations of the non-volatile memory 2220 based on the stored second request task (FQ).

When the first request task (RQ) is a read or write command, the storage controller 2210 may generate the second request task (FQ) and the second address with reference to the first address included in the first request task. In this case, the second request task (FQ) may be a read, write and/or erase command. In this case, the first address may be a logical address, and the second address may be a physical address.

The second request task (FQ) may include overhead-associated operations for managing the non-volatile memory 2220 in addition to the task requested by the first request task (RQ). The overhead may include the read, write and/or erase operations of additional data executed in the non-volatile memory 2220 in relation to garbage collection, read reclaim, wear leveling, data reliability, and mapping table management.

The task scheduler 2251 stores the second request task (FQ) in the flash queue 2270 by scheduling the first request task (RQ). The task scheduler 2251 and/or the address mapping manager 2252 converts the first address into the second address based on scheduling algorithm and address mapping algorithm.

If the first request task (RQ) is a write command, the write date stored in the host memory 2140 may be transmitted to the buffer memory 2213 in the storage controller 2210. Conversely, if the first request task (RQ) is a read command, the read data read in the non-volatile memory 2220 may be stored in the buffer memory 2213 in the storage controller 2210, and then transmitted to the host memory 2140. Here, the host memory 2140 may be an external memory (for example, a DRAM) connected to the host device 1100 or 2100.

The processing time of the storage device 2200 may be an interval from a time when the first request task (RQ) is fetched from the request queue 2290 to a time when the second request task (FQ) associated with the first request task (RQ) is stored in the flash queue 2270. The processing time may be used as the time cost for scheduling. The time cost may be determined according to the request task from the virtual machine, and may be compensated according to workload contribution.

Figure 5A:
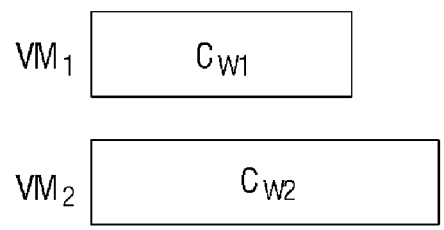
FIGS. 5A, 5B, and 5C are conceptual diagrams illustrating a method of compensating for a time cost generated from virtual machines.
Figure 5B:
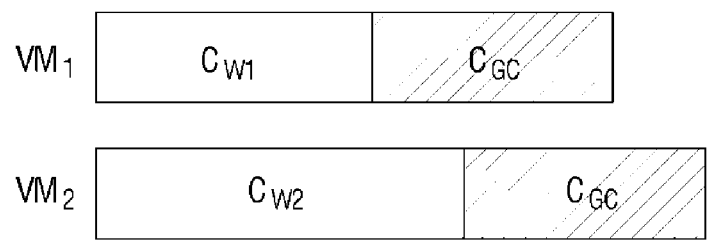
Figure 5C:
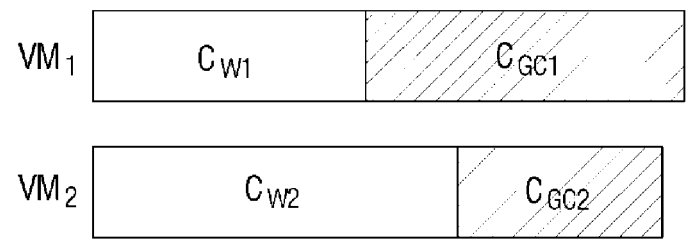
Figure 6:
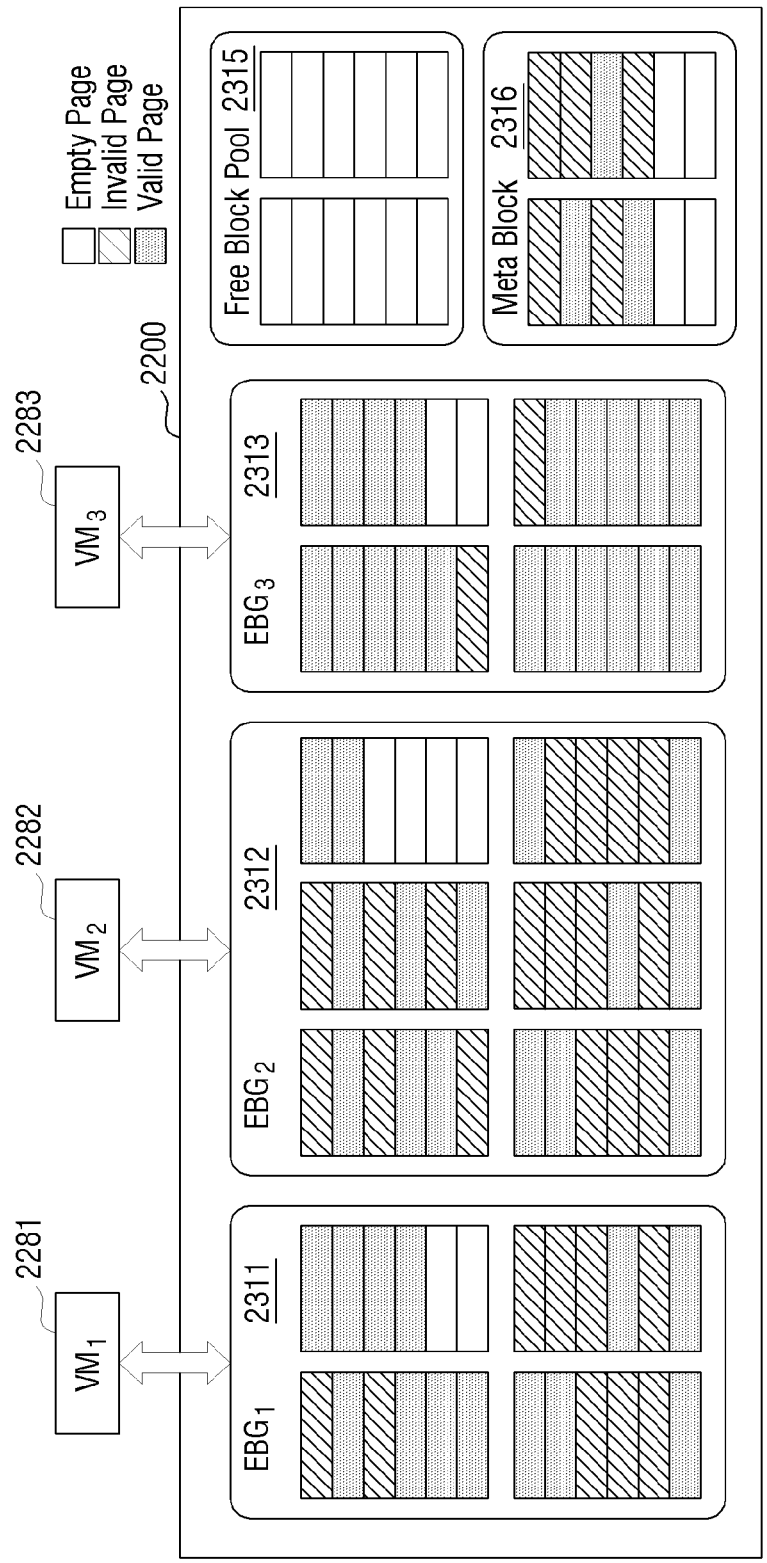
FIG. 6 is a block diagram showing block groups (BGs) independently assigned to a non-volatile memory of a storage device according to an exemplary embodiment.

FIGS. 5A, 5B, and 5C are conceptual diagrams illustrating a method of compensating for the time cost generated from virtual machines. FIG. 6 is a block diagram showing block groups (BGs) independently assigned in the non-volatile memory 2220 of the storage device 2200.

Referring to FIGS. 3 to 6, the task scheduler 2251 may schedule the data transmission between the host device 1100 or 2100 and the flash queue 2270 based on the first request task (RQ) selected from the request queue 2290. The task scheduler 2251 may assign a predetermined time budget (TB) to each of the request queues 2291 to 2294 before the scheduling of the first request task (RQ). In this case, the time budgets (TBs) assigned to all of the request queues 2291 to 2294 may have the same value.

When the first request task (RQ) is executed by the scheduling, the time budget (TB) may be reduced. The amount of the reduced time budget (TB) may be changed depending on the time cost (TC) of the request tasks (RQ) requested by the virtual machines 2281 to 2284. The method of managing the time budget (TB) and the time cost (TC) will be described in detail with reference to FIGS. 5A to 10. The execution of the first request task (RQ) may correspond to an interval from a time of fetching of the first request task (RQ) from the request queue 2290 to a time of storing of the second request task (RQ) corresponding to the first request task (RQ) in the flash queue 2270 or an interval from a time of fetching the first request task (RQ) from the request queue 2290 to a time of fetching the second request task (RQ) from the flash queue 2270. That is, the time cost (TC) of the request tasks requested by the virtual machines may be determined based on the time taken to execute the request tasks. For example, if the execution time of the request tasks is 10 ms, the time cost corresponding to this execution time may be 10.

When the first request task (RQ) stored in the request queue 2290 is scheduled, the processing unit thereof may be the page unit of the non-volatile memory. That is, when the task of the page unit of the non-volatile memory is processed, the time budget (TB) of the corresponding request queues 2291 to 2294 may be reduced by the time cost (TC) of the executed request task. In this case, the time cost (TC) may correspond to the time cost (TC) of the divided request task.

Among the request queues 2291 to 2294, the request queue having completely exhausted the time budget (TB) may be excluded from the scheduling until the time budget (TB) is reassigned to the corresponding request queue. When all of the request queues 2291 to 2294 have completely exhausted the time budgets (TBs), all of the request queues 2291 to 2294 may be reassigned with time budgets (TBs). In this case, the time budgets (TBs) reassigned all of the request queues 2291 to 2294 may have the same value.

The scheduler 2251 according to some exemplary embodiments may have a work conserving scheduling policy to increase the utilization of the storage device 2200. That is, when at least one request queue having a waiting request task exists among the request queues 2291 to 2294, the task scheduler 2251 continues the scheduling. However, when at least one request queue having no waiting request task exists among the request queues 2291 to 2294, the task scheduler 2251 skips scheduling of the request queue having no waiting request task even if time budget (TB) remains in the corresponding request queue and execute the request tasks of other request queues. To manage the remaining time budget (TB), the task scheduler determines the time cost (TC) consumed in each of the request queues 2291 to 2294.

The time cost (TC) may be determined based on workloads generated from the virtual machines 2281 to 2284 in the storage device 2200. For example, the time cost (TC) may be determined by reflecting the workload caused by the request task (for example, write operation or read operation) requested by the virtual machines 2281 to 2284 and the workload caused by the overhead for a flash management operation such as garbage collection, wear leveling, or mapping table management. The rate of workloads between the virtual machines may be determined based on the workload caused by the request task of the virtual machine and the workload caused by the overhead associated with the request task. In this case, the rate of workloads between the virtual machines may be defined by workload contribution. That is, the rate of workloads between the virtual machines may be defined by the workload contribution of the storage device 2200. Consequently, the task scheduler 2251 may schedule the request tasks of the virtual machines depending on the workload contribution of the request task of each of the virtual machines.

The workload contribution according to an exemplary embodiment means the relative generation rate of workloads when a plurality of virtual machines generates a plurality of workloads. The workload may include a read or write operation caused by the request task of the virtual machine and additional operations (for example, overhead, such as garbage collection, read reclaim, and the like). The WA-BC type scheduling method will be described in detail with reference to FIGS. 6 to 10.

To determine the time cost (TC), a regression based cost modeling method may be used. In this case, the time cost (TC) may be determined based on the kind of the request tasks, the number of times of the request tasks, and the time cost caused by the request tasks. Equation (1) represents the time cost ($TC_i$) of virtual machine measured during the profiling interval. Here, the profiling means a procedure of extracting the information about the estimated target depending on known characteristics and variables.

$$TC_i = C_R \times N_R(i) + C_W \times N_W(i) \tag{1}$$

In Equation (1), $C_R$ and $C_W$ represent time cost for a read request and time cost for a write request, respectively. $N_R(i)$ and $N_W(i)$ represent the number of read requests and the number of write requests during the $i_{th}$ profiling interval, respectively. Here, the unit of a read request or a write request may be the page unit of the non-volatile memory.

The time cost ($C_R$) for a read request and the time cost ($C_W$) for a write request may be values determined depending on the execution time for a read request and execution cost for a write request measured by profiling. That is, the $i_{th}$ time cost ($TC_i$) may be the sum of the product of the number of read requests executed during the $i_{th}$ profiling interval and the time cost ($C_R$) for a read request and the product of the number of write requests executed during the $i_{th}$ profiling interval and the time cost ($C_W$) for a write request.

The task scheduler 2251 may determine the time cost of the virtual machines 2281 to 2284 by accumulating K time costs ($TC_i$) during K profiling intervals. For example, the task scheduler 2251 executes linear regression analysis based on K regression equations of each of the time cost ($C_R$) for read request and the time cost ($C_W$) for a write request during K profiling intervals, and predicts the time cost ($C_R$) for a read request and the time cost ($C_W$) for a write request. When the number of read requests and the number of write requests are measured based on the predicted time cost ($C_R$) for a read request and the predicted time cost ($C_W$) for a write request, the time cost (TC) caused by the corresponding virtual machine (VM) may be predicted. In exemplary embodiments, the time taken to execute regression analysis may be very short (e.g., several unit seconds).

The time cost ($C_R$) for a read request and the time cost ($C_W$) for a write request may be periodically measured. For example, the time cost ($C_R$) for a read request and the time cost ($C_W$) for a write request may be updated by periodically measuring the time costs with respect to each $K_{th}$ profiling interval.

The measurement cycle of each of the time cost ($C_R$) for a read request and the time cost ($C_W$) for a write request may be determined based on the errors of regression analysis results and the sensitivity to the change of workload. For example, when the size of error of the predicted value and the measured value of the regression analysis result is larger, the measurement cycle may be longer. Further, when the change of workload frequently occurs for a short period of time, the measurement cycle may be shorter.

The time cost ($C_R$) for a read request and the time cost ($C_W$) for a write request may be changed depending on the read and write characteristics of storage media of the storage device 2200, and may be different from each other. That is, in the case of non-volatile memory, the time cost ($C_R$) for a read request and the time cost ($C_W$) for a write request may be determined depending on the characteristics of memory cell (e.g., reading speed, writing speed, whether erasing is performed before writing, and the like). In the case of the NAND flash memory, the time cost ($C_W$) for a write request may be larger than the time cost ($C_R$) for a read request because the write latency of memory cell is larger than the read latency thereof.

Referring to FIGS. 5A to 5C again, each of the virtual machines 2281 to 2284 may have its own time cost (TC). The storage device 2200 according to an exemplary embodiment may fairly execute performance isolation or resource distribution based on the time cost (TC) required for each of the virtual machines 2281 to 2284.

When the storage controller 2210 executes the request task of one of the virtual machines 2281 to 2284, a time cost may be generated due to the execution of a write request task and a read request task. The virtual machines 2281 to 2284 may generate an internal overhead in addition to the execution of the read or a write request task. Here, the internal overhead may be an overhead executed to manage the inside of the storage device 2200, such as garbage collection, address mapping table management, read claim, or wear leveling. For example, in the case of the when the storage device 2200 is a solid state driver (SSD) which is a storage device using the non-volatile memory, when one of the virtual machines 2281 to 2284 frequently generates a small random write request in the non-volatile memory 2220, garbage collection may be frequently generated.

The garbage collection may be generated when the number of usable flash blocks in the storage device 2200 is small (for example, when storage efficiency, which is based on a ratio of the number of used pages to the number of valid pages, is lowered). At the time of executing the garbage collection, the storage device 2200 assigns one flash block to a free block pool 2315, and copies only the valid page of an old flash block having many invalid pages to the assigned flash block through merge operation. Then, the old flash block may be converted into a free block by erasing. Consequently, at the time of performing the garbage collection, since the storage device 2200 stops the request tasks requested by the virtual machines 2281 to 2284 and executes the above-mentioned page data copy and block erasing tasks, the execution time of the request task causing overhead may increase. To separate the request task causing the overhead from other request tasks, the storage device 2200 may assign an independent block group with respect to each of the virtual machines 2281 to 2284, and execute the corresponding request task in the assigned block group.

The overhead internally generated by one virtual machine (VM) may influence the execution of tasks of other virtual machines (VMs). That is, the execution of tasks of other virtual machines (VMs) may be delayed due to the overhead generated at the execution of task of one virtual machine (VM). Therefore, to fairly execute the tasks of the virtual machines (VMs), isolation and resource distribution may be performed by predicting a workload that may be generated by one of the virtual machines 2281 to 2284, and the workload may be represented as a time cost (TC). The time cost (TC) may include a time cost to process the write and read request tasks of each virtual machine (VM) and a time cost of the overhead caused by the request tasks.

For convenience of explanation, a case in which the overhead of the storage device 2200 is caused by garbage collection will be described as an example. Referring to FIG. 5A, the time cost for a write request of the first virtual machine ($VM_1$) may be represented by first time cost ($C_{W1}$), and the time cost for a write request of the second virtual machine ($VM_2$) may be represented by second time cost ($C_{W2}$).

FIG. 5A shows the first time cost ($C_{W1}$) for a write request of the first virtual machine ($VM_1$) and the second time cost ($C_{W2}$) for a write request of the second virtual machine ($VM_2$), when overhead is not generated. For example, the first time cost ($C_{W1}$) may be a time cost for a random write, and the second time cost ($C_{W2}$) may be a time cost for a sequential write.

FIG. 5B shows the times costs (TCs) of the first virtual machine ($VM_1$) and the second virtual machine ($VM_2$), when taking into account the time cost ($C_{GC}$) caused by the overhead (for example, garbage collection) generated at the time of executing the request tasks of the first virtual machine ($VM_1$) and the second virtual machine ($VM_2$). As shown in FIG. 5B, if the entire overhead is uniformly shared by all of the virtual machines (VMs), it may be difficult to ensure the performance isolation of each virtual machine (VM).

FIG. 5C shows the compensated time cost (TC) of each virtual machine (VM), when the time cost (TC) of each of the virtual machines ($VM_1$ and $VM_2$) is compensated based on degree of the contribution of the corresponding virtual machine to the workload caused by overhead. For example, when the degree of the contribution of the first virtual machine ($VM_1$) to the workload is larger than the degree of the contribution of the second virtual machine ($VM_2$) to the workload in terms of overhead, a greater amount of the time cost (TC) caused by overhead may be assigned to the first virtual machine ($VM_1$).

Here, by using the time cost (TC) that is determined with respect to each of the virtual machines 2281 to 2283, the task scheduler 2251 may fairly schedule the request task of each of the virtual machines 2281 to 2284 based on the determined time cost (TC) of each of the virtual machines 2281 to 2284. For example, whenever the request task of the corresponding virtual machine (VM) is executed based on the above determined time cost (TC), the time budget (TB) of each of the virtual machines 2281 to 2284 may be reduced by the above determined time cost (TC). In an exemplary embodiment, whenever data transmission is executed by a page unit (for example, 4 KB) from the request queue 2231 to the flash queue 2213, the task scheduler 2251 may reduce the above time budget (TB) by the above time cost (TC).

In some exemplary embodiments, the task scheduler 2251 may reduce the time budget (TB) by the time cost (TC) by using an address mapping unit. Here, the address mapping unit refers to a unit configured to manage recorded data in a mapping table. For example, when the address mapping manager 2252 of a page mapping type is used, the address mapping unit may be a page unit, and when the address mapping manager 2252 of a page mapping type is used, the address mapping unit may be a block unit. The address mapping unit is not limited to a page or block unit. For example, the address mapping unit may be a plurality of page group units.

In some exemplary embodiments, if one virtual machine (VM) causes a less overhead, more time budget (TB) may be assigned to each of the virtual machines 2281 to 2284. That is, the task scheduler 2251 may adjust the time budget (TB) of the virtual machines (VMs) based on the workload contribution of the storage device 2200.

If time budget (TB) does not remain in one of the request queues 2291 to 2294, the task scheduler 2251 waits until all of the time budgets (TBs) of other request queues 2290 are exhausted, or waits until the waiting tasks of other request queues 2290 do not exist. If all of the time budgets (TBs) of other request queues 2290 are exhausted or the waiting tasks of other request queues 2290, excluding the time budget-exhausted request queues, do not exist, the task scheduler 2251 may reassign time budgets to the time budget-exhausted request queues. In this case, the task scheduler 2251 may also reassign time budgets to the time budget-remaining other request queues.

Consequently, in the task scheduler 2251 according to exemplary embodiments, since the virtual machine having a relatively large time cost (TC) or the virtual machine having a relatively small time budget (TB) may exhaust the time budget (TB) assigned thereto during the execution of request task, the waiting time may increase until the corresponding virtual machine is reassigned with time budget (TB), and thus there is an effect of delaying the execution of a request task. In contrast, since the virtual machine having a relatively small time cost (TC) or the virtual machine having a relatively large time budget (TB) has a relatively large amount of the time budget (TB) assigned thereto during the execution of request task, the corresponding virtual machine may not need to wait for the corresponding virtual machine to be reassigned with time budget (TB), and thus there is an effect of rapidly executing a request task. Consequently, in the task scheduling method according to exemplary embodiments, performance isolation may be ensured by reducing performance interference through fair resource distribution between the virtual machines 2281 to 224 based on the time budget (TB) and time cost (TC) of the virtual machines 2281 to 2284.

Referring to FIG. 5A to FIG. 6 again, for efficient performance isolation and fair resource distribution, as described above, the compensated time cost (TC) may be determined based on determiningthe time cost (TC) caused by the overhead of the storage device 2200 and generated by each of the virtual machines 2281 to 2283. In the task scheduling method according to exemplary embodiments, the compensated time cost (TC) of each of the virtual machines 2281 to 2283 may be determined based on the structural characteristics of the storage device 2200.

Referring to FIG. 6, the storage device 2200 may be an SSD device including a non-volatile memory. The storage device 2200 may include a block group (BG) assigned to each of the virtual machines 2281 to 2283. For example, the block groups (BGs) may be erase block groups (EBGs) 2311 to 2313. The storage device 2200 may further include the free block pool 2315 for garbage collection. The blocks in the erase block group (EBG) assigned to virtual machines (VMs) may include valid pages for storing valid page data and invalid pages for storing invalid previous page data. Here, the task scheduler 2251 may determine the storage efficiency of each of the erase block groups 2311 to 2313 based on the ratio of the number of used pages to the number of valid pages in each of the erase block groups 2311 to 2313. The storage efficiency may correspond to a write amplification factor (WAF).

The storage device 2200 may include the first erase block group 2311 including four blocks assigned to the first virtual machine 2281, may include the second erase block group 2312 including six blocks assigned to the second virtual machine 2282, and may include the third erase block group 2313 including four blocks assigned to the third virtual machine 2283. The storage device 2200 may further include the free block pool 2315 including four erase blocks. The free blocks included in the free block pool 2315 may be erased blocks. For the convenience, it is shown in FIG. 6 that each block has six pages, but exemplary embodiments are not limited thereto.

In some exemplary embodiments, each of the erase block group 2311 to 2313 may be independently assigned to only one application or only one of the virtual machines 2281, 2282, and 2284, and may be used. That is, the blocks in one of the erase block groups 2311, 2312, and 2313 may not be shared with other virtual machines 2281 to 2284. In this case, a target address may be managed such that data of one of the virtual machines 2281, 2282, and 2283 are not distributed and stored in the erase block groups 2311, 2312, and 2313 assigned to other virtual machines. The management of the target address may be executed by the task scheduler 2251 and the address mapping manager 2252.

In some exemplary embodiments, when the storage space of one of the virtual machines 2281, 2282, and 2283 in the storage device 2200 is insufficient, the virtual function manage module 2250 assigns, as new blocks, the free blocks in the free block pool 2315 to the erase block groups 2311, 2312, and 2313 of the corresponding virtual machines 2281, 2282, and 2283, and copies valid page data to the newly assigned blocks through a merge operation. In this case, the corresponding pages storing the previous valid page data is converted into invalid pages. The blocks having a small number of valid pages may be converted into the free blocks of the free block pool 2315 through a garbage collection operation. Consequently, the independent block group assigned to one virtual machine (VM) may variably control the number of the blocks included therein. For example, a variable dedicated erase block group may be assigned to each of the virtual machines.

In some exemplary embodiments, when the storage space of one of the virtual machines 2281, 2282, and 2283 in the storage device 2200 is insufficient, the virtual function manage module 2250 may assign, as an additional erase block group, the plurality of free blocks in the free block pool 2315 to the corresponding virtual machines 2281, 2282, and 2283. Therefore, one or more independent erase block groups may be assigned to one of the virtual machines 2281, 2282, and 2284.

The task scheduler 2251 may measure the time cost (TC) of the erase block groups 2311 to 2313 to measure the time cost (TC) of the virtual machines 2281 to 2283. For example, the time cost (TC) of the erase block groups 2311 to 2313 may be measured based on the above-mentioned storage efficiency of each of the erase block groups 2311, 2312, and 2313. For example, the storage efficiency may correspond to a write amplification factor (WAF). In this case, the storage efficiency and the write amplification factor (WAF) may be in inverse proportion to each other. The write amplification factor (WAF) may refer to the ratio of the total used space in the erase block group (EBG) to the valid data-stored space. For example, when the number of the total used pages in the first erase block group 2311 of FIG. 6 is 22 and the number of valid pages is 13, the write amplification factor (WAF) is 1.69 (22/13). Similarly, the write amplification factor (WAF) in the second erase block group 2312 is 1.73 (26/15), and the write amplification factor (WAF) in the third erase block group 2313 is 1.1 (22/20). Generally, as the write amplification factor (WAF) increases, a portion of an invalid space increases, and thus the possibility of generating garbage collection increases. Also, as the storage efficiency of each of the erase blocks 2311, 2312, and 2313 decreases, the portion of the invalid space increases, and thus the possibility of generating garbage collection increases.

Generally, when the write amplification factor (WAF) is measured while assuming that garbage collection has a greatest influence on the overhead of the storage device, the time cost (TC) generated by the corresponding virtual machine (VM) may be effectively predicted, and the task scheduler 2251 may schedule the request task in the request queue 2290 based on the predicted time cost (TC). This task scheduling method is effective in reducing the interference between the virtual machines 2281 to 2283, ensuring independent performance and efficiently distributing resource in the storage device 2200.

Equation (2) is an equation for determining the write amplification factor (WAF) $\alpha_1$ of the $i_{th}$ virtual machine (VM$_1$). The write amplification factor (WAF) $\alpha_1$ is a value obtained by dividing the number $u_1$ of used pages in the erase block group (EBG$_i$) by the number $v_1$ of valid pages. The write amplification factor (WAF) $\alpha$ of the storage device may be represented by Equation (3). That is, the write amplification factor (WAF) $\alpha$ is a value obtained by dividing the number ($\Sigma\, u_i$) of the total used pages in all of the erase block groups (EBGs) of the storage device by the number ($\Sigma\, v_i$) of total valid pages.

$$\alpha_i = u_i / v_i \quad (2)$$

$$\alpha = \Sigma u_i / \Sigma v_i \quad (3)$$

To predict the workload contribution of each virtual machine, a normalized write request time cost $C'_W$ may be defined while assuming that overhead does not exist. That is, when it is assumed that the write request time cost $C_W$ and the write amplification factor (WAF) $\alpha$ of the storage device 2200 are in proportion to each other, the normalized write request time cost $C'_W$ may be represented by Equation (4).

Here, each virtual machine (VM) uses an independent erase block group (EBG). Therefore, when the write request time cost $C_{Wi}$ and the write amplification factor (WAF) $\alpha_i$ of the $i_{th}$ virtual machine (VM$_1$) are in proportion to each other, the normalized write request time cost $C'_W$ may be represented by Equation (5). Therefore, the write request time cost $C_{Wi}$ of the $i_{th}$ virtual machine (VM$_1$) may be represented by Equation (6) using Equation (4) and Equation (5).

$$C'_W = C_W / \alpha \quad (4)$$

$$C'_W = C_{W_i} / \alpha_i \quad (5)$$

$$C_{W_i} = C_W / \frac{\alpha_i}{\alpha} \quad (6)$$

For example, when two virtual machines (VM$_1$ and VM$_2$) 2281 and 2282 request for write operation, the total write request time cost ($C_W$) of the storage device 2200, the total write amplification factor ($\alpha$) of the storage device 2200, the write amplification factor ($\alpha_1$) of the first virtual machine (VM$_1$), and the write amplification factor ($\alpha_{12}$) of the second virtual machine (VM$_2$) are 16, 1.6, 3.2, and 1.2, respectively. That is, it may be predicted that the write request time cost ($C_{W1}$) of the first virtual machine (VM$_1$) and the write request time cost ($C_{W2}$) of the first virtual machine (VM$_2$) are 32 and 12, respectively.

As described above, the task scheduler 2251 may schedule the request task based on the predicted time cost (TC) for the task requested by each of the virtual machines 2281 to 2283. For example, the task scheduler 2251 may reduce the time budget (TB) assigned to the corresponding virtual machine by the predicted write request time cost ($C_{Wi}$) whenever the write request task of each of the virtual machines 2281, 2282, and 2283 is executed. For example, when the initial time budget of the request queue 2290 is 100, and the write request time cost ($C_{W1}$) of the first virtual machine (VM$_1$) and the write request time cost ($C_{W2}$) of the second virtual machine (VM$_2$) are 32 and 12, respectively, the time budget of the first request queue 2291 may be 68 when the write request task of the first virtual machine (VM$_1$) is executed, and the time budget of the second request queue 2292 may be 88 when the write request task of the second virtual machine (VM$_2$) is executed.

Therefore, the task of the virtual machine that generates a low time cost (TC) may be assigned with a resource during a relatively long time compared to the task of the virtual machine that generates a high time cost (TC). Consequently, the task scheduling according to an exemplary embodiment may reduce the interference between virtual machines (VMs) and provide performance isolation and fair resource distribution of each virtual machine (VM).

In some exemplary embodiments, the method of measuring the time cost (TC) of the virtual machine (VM) based on the storage efficiency referred to as the write amplification factor (WAF) has been described, but exemplary embodiments are not limited thereto. For example, the time cost (TC) of the virtual machine (VM) may also be measured based on read disturbance generated in word lines due to frequent read operations or based on the number of times of block erase operations or based on overhead caused by a replacement operation of blocks for reliability of the storage device 2200.

Referring to FIG. 6, the storage device 2200 may further include a meta block group 2316. The metal block group 2316 may store a write amplification factor (WAF). The meta block group 2316 may store a mapping table. In another exemplary embodiment, the write amplification factor (WAF) may be stored in one block of each of the erase block groups 2311 to 2313. In still another exemplary embodiment, the write amplification factor (WAF) may be stored in the meta block included in each of the erase block groups 2311 to 2313. The write amplification factor (WAF) $\alpha_i$, in the erase block group (EBG) may be determined based on the write amplification factor (WAF) $\alpha$ stored in each block.

In some exemplary embodiments, the time cost (TC) of the storage device 2200 may be determined depending on the time cost (TC) of workload generated from each of the virtual machines 2281 to 2284 supported by the storage device 2200. Each of the virtual machines 2281 to 2284 may have the same initial time cost (TC). In another exemplary embodiment, the initial time cost (TC) of each of the virtual machines 2281 to 2284 may be received from the host device 1100 or 2100. Further, the time cost (TC) of each of the virtual machines 2281 to 2284, determined in the storage device 2200, may be transmitted to the host device 1100 or 2100, and then stored in the host device 1100 or 2100. The time cost (TC) stored in the host device 1100 or 2100 may be transmitted to the storage device 2200 later again. For example, when one virtual machine is ended and then a new virtual machine that is the same as the previous virtual machine is generated, the time cost (TC) of the corresponding virtual machine, stored in the host device 1100 or 2100, may be transmitted from the host device 1100 or 2100 to the storage device 2200 again. The transmitted time cost (TC) may be used as the initial time cost (TC).

For example, since the storage efficiency or write amplification factor (WAF) described with reference to FIG. 6 may correspond to the time cost (TC) of the corresponding virtual machine, all of the erase block groups 2311 to 2313 assigned to the virtual machines 2281 to 2284 may have the same initial write amplification factor (WAF). When the erase block groups 2311 to 2313 are assigned to the virtual machines 2281 to 2284, the storage device 2200 receives the initial write amplification factor (WAF) from the host device 1100 or 2100, and stores the received initial write amplification factor (WAF) in the assigned erase block groups 2311 to 2313 or the meta block group 2315.

The storage device 2200 may determine the initial size (that is, the number of blocks) of the erase block group (EBG) assigned to each of the virtual machines 2281 to 2284 based on the received initial write amplification factor (WAF). The storage device 2200 may execute the requested task, and may re-adjust the size of the erase block group (EBG) based on updated write amplification factor (WAF). For example, when the value of the write amplification factor (WAF) exceeds a first limit value, the storage device 220 may increase the size of the erase block group (EBG) by the number of new blocks.

The write amplification factor (WAF) stored in the storage device 2200 may be updated whenever the ratio between the number ($u_i$) of used pages and the number ($v_i$) of valid pages is changed. For example, the write amplification factor (WAF) stored in the storage device 2200 may be updated when the write task in the erase block group, requested by each of the virtual machines 2281 to 2284, is completed or when the garbage collection in the erase block group is completed.

When each of the virtual machines is ended and the erase block group (EBG) assigned to the virtual machine (VM) is released, the storage device 2200 according to exemplary embodiments may delete the write amplification factor (WFA) of the erase block group (EBG), or may transmit the final write amplification factor (WFA) of the corresponding virtual machine (VM) to the host device 1100 or 2100. The final write amplification factor (WFA) may have a minimum value and/or a maximum value.

The minimum value and/or the maximum value mean the minimum value and/or maximum value recorded by the write amplification factor in the corresponding erase block group (EBG). The host device 1100 or 2100 may store the received write amplification factor as a write amplification factor (WAF) for the request task of the corresponding virtual machine (VM). The write amplification factor (WAF) stored in the host device 1100 or 2100 may be transmitted to the storage device 2200 before a new virtual machine (VM) executing the same task as the previous request task is assigned with a new erase block group (EBG).

The write amplification factor (WFA) received from the host device 1100 or 2100 may have a minimum value and a maximum value. The storage device 2200 may determine the size of the erase block group (EBG) assigned to the virtual machine (VM) based on the minimum value and/or maximum value of the received write amplification factor (WFA).

The storage device 2200 according to exemplary embodiments may recover the finally-updated storage efficiency (for example, write amplification factor (WAF)) when power is supplied again after a sudden power shutdown. For example, the storage device 2200 may recover the finally-stored erase block group (EBG) and recover the updated write amplification factor before the power shutdown based on the ratio between the number ($u_i$) of used pages and the number ($v_i$) of valid pages in the recovered erase block group (EBG). Further, the storage device 2200 may recover the write amplification factor (WAF) stored in the dummy area or status block in the recovered meta block group or erase block group (EBG) after power is supplied again.

Referring to FIGS. 4 to 6, the storage device according to exemplary embodiments may include a non-volatile memory 2220 including a plurality of blocks and a storage controller 2210 connected to the non-volatile memory 2220 to respectively assign independent erase block groups 2311 to 2313 to a plurality of virtual machines in the non-volatile memory 2220 and to schedule the request tasks of the plurality of virtual machines 2281 to 2284 based on workload contribution of the plurality of virtual machines 2281 to 2284. The workload contribution, as described above, may be determined based on the storage efficiency of valid data in the erase block groups 2311 to 2313. The storage efficiency of valid data may be determined by the ratio between the number of used pages and the number of valid data in the erase block groups 2311 to 2313.

The storage controller 2210 of the storage device 2200 according to exemplary embodiments may be implemented in a system-on-chip. The storage controller 2210 may include a task scheduler 2251 that schedules the request tasks (RQs) of a plurality of virtual machines 2281 to 2284 based on workload contribution of the plurality of virtual machines 2281 to 2284, flash queues 2271 to 2274 connected to the external non-volatile memory 2220 through a plurality of channels, and an address mapping manager 2252 that manages the address mapping of data stored in the external non-volatile memory 2220. The task scheduler 2251 may assign time budgets to request queues 2291 to 2294 to schedule the request tasks (RQs) of the plurality of virtual machines 2281 to 2284.

Figure 7:
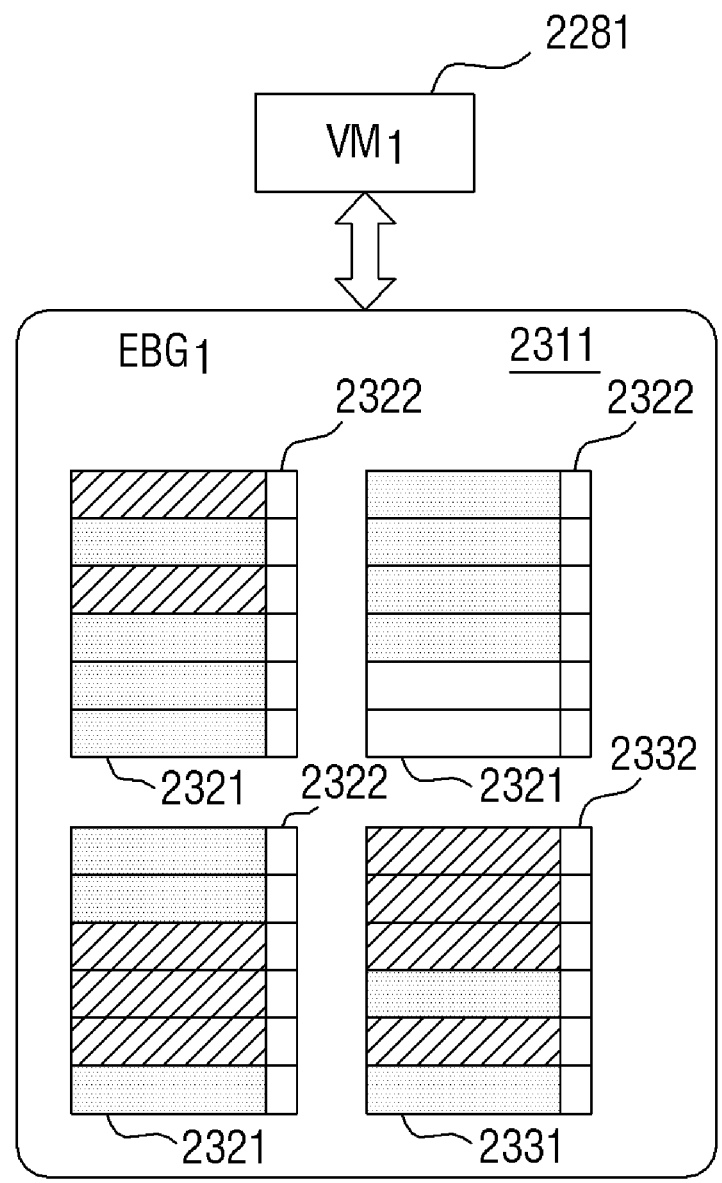
FIG. 7 is a detailed block diagram of an erase block group of FIG. 6.

FIG. 7 is a detailed block diagram of the erase block group of FIG. 6 according to an exemplary embodiment. The structure of the erase block group will be described with respect to the first virtual machine 2281 as an example.

Referring to FIG. 7, the erase block group 2311 include at least one block 2321 or 2331 having a dummy area 2322 or 2332. The erase block group 2311 may be assigned to the first virtual machine 2281. In an exemplary embodiment, the above-mentioned write amplification factor (WAF) of FIG. 6 may be stored in one dummy area 2322 or 2332 of the blocks 2321 and 2331.

The erase block group 2311 may include a data block 2321 for storing transmitted data, and a status block 2331 for managing the task of the erase block group 2311 and the virtual machine 2281. In another exemplary embodiment, the storage efficiency (for example, write amplification factor (WAF)) of the erase block group 2311 or the write amplification factor (WAF) of the data block 2321 may be stored in the status block 2331.

Figure 8:
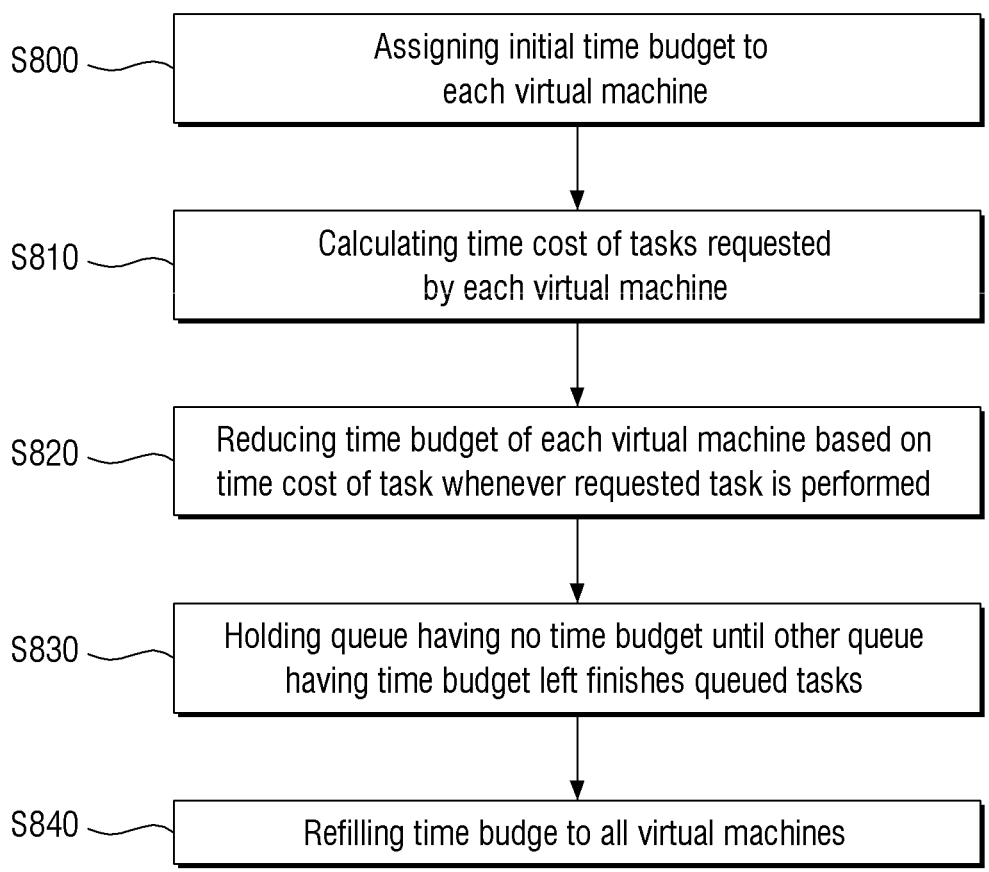
FIG. 8 is a flowchart illustrating a task scheduling method based on a time budget (TB) according to an exemplary embodiment.

FIG. 8 is a flowchart illustrating a task scheduling method based on time budget according to an exemplary embodiment. Referring to FIGS. 3 to 8, the task scheduler 2251 may assign an initial time budget (TB) to each of the virtual machines 2281 to 2284 (S800). The storage device 2200 may determine a time cost (TC) for the corresponding virtual machine or the corresponding task while executing the task (RQ) requested by each of the virtual machines 2281 to 2284 (S810). In an exemplary embodiment, to determine the time cost (TC), the task scheduler 2251 may use a regression based cost modeling technique. In another exemplary embodiment, the write amplification factor (WAF) that is determined based on the result of page write executed in the corresponding erase block group (EBG) by the write request task of each of the virtual machines 2281 to 2284 may correspond to the time cost (TC) of the write request task.

The task scheduler 2251 of the storage device 2200 may reduce the time cost (TC) associated with the task executed in the time budget (TB) assigned to the corresponding virtual machine whenever the task requested by each of the virtual machines 2281 to 2284 is executed (S820). In an exemplary embodiment, the task scheduler 2251 may reduce the time cost (TC) from the time budget (TB) whenever data are transmitted from the request queue 2290 to the flash queue 2270 in a page unit (for example, 4 KB). In another exemplary embodiment, the task scheduler 2251 may reduce the time cost (TC) from the time budget (TB) in an address mapping unit. Here, the address mapping unit is a unit for managing recorded data in a mapping table. For example, when the address mapping manager 2252 uses a page mapping type address mapping, the address mapping unit may be a page unit. However, this address mapping unit is not limited to the page unit, and may be a plurality of page groups or a block unit.

If there is no remaining time budget (TB) of the request queue 2290, the task scheduler 2251 waits until all of the time budgets (TBs) of other request queues are exhausted, or waits until the waiting tasks of other request queues 2290 do not exist (S830). If all of the time budgets (TBs) of other request queues are exhausted or the waiting tasks of other request queues 2290 excluding the time budget-exhausted request queues do not exist, the task scheduler 2251 may refill the time budget-exhausted request queue (for example, request queue 2291) with time budget. In this case, the task scheduler 2251 may also refill the time budget-remaining other request queues (for example, request queues 2292 to 2294) with time budgets (S840).

Consequently, in the method of compensating for the time cost (TC) for request task according to exemplary embodiments, since the virtual machine having a relatively large time cost (TC) or the virtual machine having a relatively small time budget (TB) may exhaust the time budget (TB) assigned thereto more quickly by executing the request task, the waiting time may increase until the corresponding virtual machine is refilled with time budget (TB), and thus there is an effect of delaying the execution of a request task in the corresponding virtual machine. In contrast, since the virtual machine having a relatively small time cost (TC) or the virtual machine having a relatively large time budget (TB) may exhaust the time budget (TB) assigned thereto more slowly by executing the request task, waiting time for refilling the corresponding virtual machine with time budget (TB) may not be needed, and thus there is an effect of rapidly executing a request task in the corresponding virtual machine. Therefore, in the method of compensating for the time cost (TC) for request task according to exemplary embodiments, it is possible to ensure fair resource distribution between virtual machines (VMs) and performance isolation based on the time budget (TB) and time cost (TC) of the virtual machines (VMs).

Figure 9:
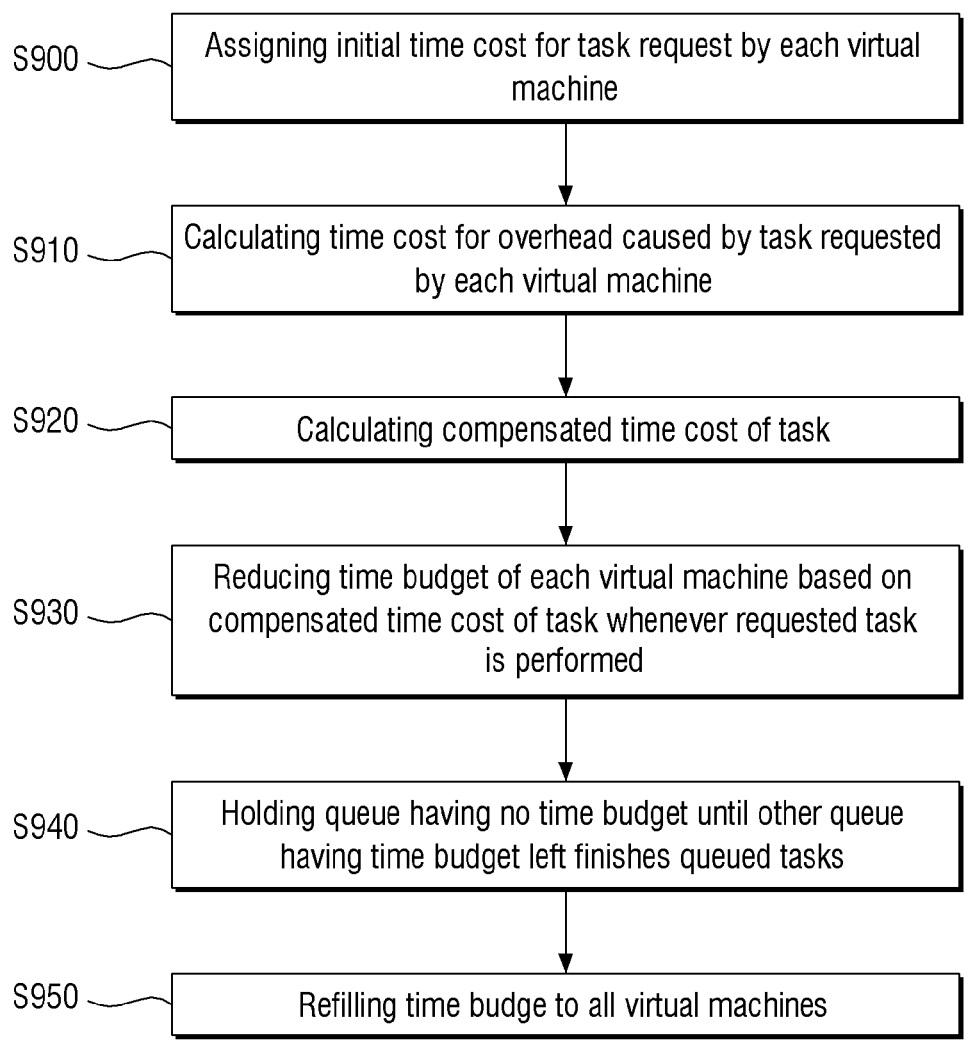
FIG. 9 is a flowchart illustrating a method of compensating for a time cost for a request task according to an exemplary embodiment.

FIG. 9 is a flowchart illustrating a method of compensating for the time cost for task request according to an exemplary embodiment.

Referring to FIGS. 1 to 9, the task scheduler 2251 may assign the initial time cost for the task requested by each virtual machine (VM) (S900). For example, the task scheduler 2251 may assign the initial time cost for the request task of the corresponding virtual machine (VM) based on the time cost (TC) that corresponds to a case where the overhead for the request task is not generated. Further, the task scheduler 2251 may assign the same time costs to all of the virtual machines (VMs).

The storage device 2200 may determine the time cost (TC) for the overhead of the corresponding task while executing the task requested by each of the virtual machines 2281 to 2284 (S910). In an exemplary embodiment, to determine the time cost (TC) for the overhead, the task scheduler 2251 may use the regression base cost modeling technique described with reference to FIGS. 5A to 5C.

The task scheduler 2251 of the storage device 2200 may determine the compensated time cost (TC) for the task requested by the virtual machine (VM) (S920). In an exemplary embodiment, the task scheduler 2251 may assign the sum of the initial time cost (TC) for the request task of the virtual machine and the time cost (TC) for the overhead caused by the corresponding request task as the time cost (TC) for the request task. In another exemplary embodiment, as shown in FIG. 6, the task scheduler 2251 may determine the write amplification factor (WAF) corresponding to the time cost (TC) caused by the write request task of each of the virtual machines 2281 to 2284.

The task scheduler 2251 of the storage device 2200 may reduce the time cost (TC) associated with the task executed in the time budget (TB) assigned to each of the virtual machines 2281 to 2284 whenever the task requested by each virtual machine (VM) is executed (S930). In an exemplary embodiment, the task scheduler 2251 may reduce the time cost (TC) from the time budget (TB) whenever data are transmitted from the request queue 2290 to the flash queue 2270 in a page unit (for example, 4 KB). In another exemplary embodiment, the task scheduler 2251 may reduce the time cost (TC) from the time budget (TB) in an address mapping unit. Here, the address mapping unit is a unit that manages recorded data in a mapping table. For example, when the address mapping manager (FTL) 2252 uses a page mapping type address mapping, the address mapping unit may be a page unit. However, this address mapping unit is not limited to the page unit, and may be a plurality of page groups or a block unit.

If there is no remaining time budget (TB) of the request queue 2290, the task scheduler 2251 waits until all of the time budgets (TBs) of other request queues are exhausted, or waits until the waiting tasks of other request queues 2290 do not exist (S940). If all of the time budgets (TBs) of other request queues are exhausted or the waiting tasks of other request queues 2290 excluding the time budget-exhausted request queues do not exist, the task scheduler 2251 may refill the time budget-exhausted request queues with time budgets. In this case, the task scheduler 2251 may also refill the time budget-remaining other request queues with time budgets (S950).

Consequently, in the method of compensating for the time cost (TC) for request task according to exemplary embodiments, since the virtual machine (VM) having a relatively large time cost (TC) or the virtual machine (VM) having a relatively small time budget (TB) may exhaust the time budget (TB) assigned thereto more quickly by executing the request task, the waiting time may increase until the corresponding virtual machine is refilled with time budget (TB), and thus there is an effect of delaying the execution of a request task in the corresponding virtual machine. In contrast, since the virtual machine (VM) having a relatively small time cost (TC) or the virtual machine (VM) having a relatively large time budget (TB) may exhaust the time budget (TB) assigned thereto more slowly by executing the request task, waiting time for refilling the corresponding virtual machine with time budget (TB) may not be needed, and thus there is an effect of rapidly executing a request task in the corresponding virtual machine. Therefore, in the method of compensating for the time cost (TC) for request task according to exemplary embodiments, it is possible to ensure fair resource distribution between virtual machines (VMs) and performance isolation based on the time budget (TB) and time cost (TC) of the virtual machines (VMs).

Figure 10:
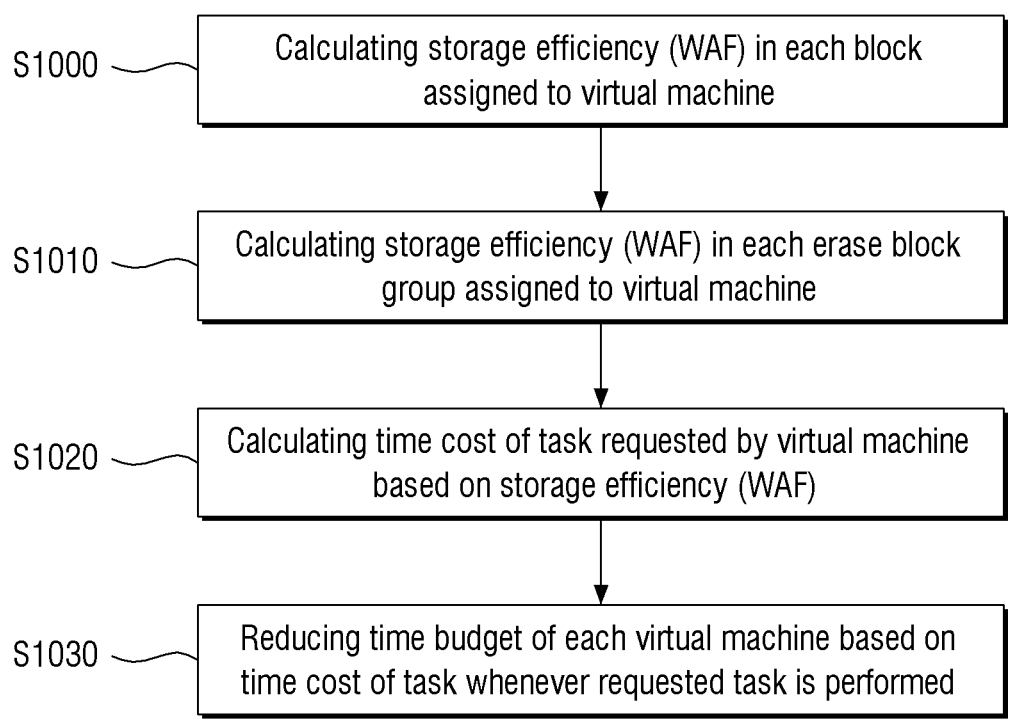
FIG. 10 is a flowchart illustrating a task scheduling method based storage efficiency according to an exemplary embodiment.

FIG. 10 is a flowchart illustrating a task scheduling method based the storage efficiency (for example, write amplification factor (WAF)) described with reference to FIG. 6. Referring to FIGS. 2 to 10, the task scheduler 2251 of the storage device 2200 may determine the write amplification factor (WAF) of each block included in each of the erase block groups 2311 to 2313 assigned to each of the virtual machines 2281 to 2284 (S1000). In this case, the write amplification factor (WAF), as described in detail with reference to FIG. 5, may be determined based on the ratio between the number ($u_i$) of used pages and the number ($v_i$) of valid pages in each block included in each of the erase block groups 2311 to 2313.

The write amplification factor (WAF) of each of the erase block groups 2311 to 2313 may be an average value of write amplification factors (WAFs) of blocks in the erase block groups 2311 to 2313 (S1010). If the task scheduler 2251 determines the ratio between the number ($u_i$) of used pages and the number ($v_i$) of valid pages with respect to the total pages included in the erase block groups 2311 to 2313 to determine the write amplification factor (WAF) of each of the erase block groups 2311 to 2313, instead of determining the write amplification factor (WAF) of each block included in each of the erase block groups 2311 to 2313, step 1000 (S1000) may be omitted.

The task scheduler 2251 of the storage device 2200 may determine the time cost (TC) of the task requested by the virtual machine (VM) based on the above determined write amplification factor (WAF) (S1020). In this case, the above determined write amplification factor (WAF) and the above time cost (TC) may be in proportion to each other. For example, when the storage device 2200 is a solid state driver (SSD), which is a storage device using a non-volatile memory, and the write operation of a page unit, caused by the write request of each of the virtual machines 2281 to 2284, increases, the probability of an overhead such as garbage collection being generated in the erase block group (EBG) assigned to the virtual machine associated with the write request may increase in proportion to the increase in the write operation.

The task scheduler 2251 of the storage device 2200 may reduce the time cost (TC) associated with the task executed in the time budget (TB) assigned to each of the virtual machines 2281 to 2284 whenever the task requested by each virtual machine (VM) is executed (S1030). In an exemplary embodiment, the task scheduler 2251 may reduce the time cost (TC) from the time budget (TB) whenever data are transmitted from the request queue 2290 to the flash queue 2270 in a page unit (for example, 4 KB). In another exemplary embodiment, the task scheduler 2251 may reduce the time cost (TC) from the time budget (TB) in an address mapping unit whenever data are transmitted from the request queue 2290 to the flash queue 2270 in an address mapping unit. Here, the address mapping unit is a unit managing recorded data in a mapping table. For example, when the address mapping manager (FTL) 2252 uses a page mapping type address mapping, the address mapping unit may be a page unit. However, this address mapping unit is not limited to the page unit, and may be a plurality of page group units.

Figure 11:
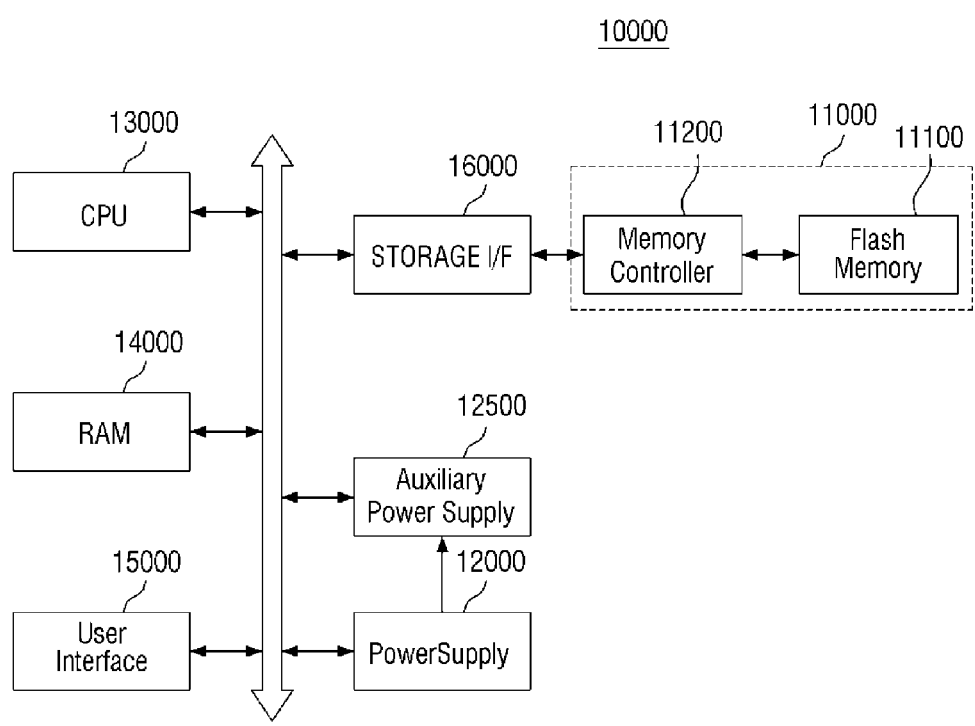
FIG. 11 is a block diagram of a storage system according to an exemplary embodiment.

FIG. 11 is a block diagram of a storage system according to an exemplary embodiment. Referring to FIG. 11, a storage system 10000 may include a storage device 11000, a power supply 12000, a central processing unit (CPU) 13000, memory 14000, a user interface 15000, and a storage interface 16000. Here, the storage device 11000 includes a non-volatile memory 11100 and a memory controller 11200. The storage system 10000 may further include an auxiliary power supply 12500. The auxiliary power supply 12500 may be a battery or an uninterruptible power supply (UPS). The storage system 10000 may correspond to the storage system 1000 or 2000 of FIG. 1 or 2. The storage device 11000 may correspond to the storage device 1200 or 2200 described with reference to FIGS. 1 to 10. The storage interface 16000 may correspond to the storage interface 1150 or 1250 of FIG. 1 or 2. The non-volatile memory 11100 may correspond to the non-volatile memory 1220 or 2220 as shown in FIGS. 1 to 4. The memory controller 11200 may correspond to the controller 2250 of FIG. 4. The memory 14000 may correspond to the host memory 1140 or 2140 of FIG. 1 or 2. The central processing unit (CPU) 13000 may correspond to the host core 1110 or 2110 of FIG. 1 or 2.

The storage system 10000 according to exemplary embodiments, as described above, may include the non-volatile memory 11100 including an independent erase block group corresponding to each of a plurality of virtual machines and the memory controller 11200 that schedules the request tasks of the plurality of virtual machines based on workload contribution of the plurality of virtual machines. The storage system 10000 may include the memory controller 11200 that controls the non-volatile memory 11100 and the storage interface that interfaces with the memory controller 11200. The storage system 10000 may further include the memory 14000 that stores the command and data transmitted to the storage device 11000. The central processing unit (CPU) 13000 and the storage interface 16000 in the storage system 10000 may be implemented in one application processor. The application processor may be implemented in a system-on-chip.

The storage system 10000 according to exemplary embodiments, as described above, allows the storage device 11000 to support virtual functions, to more effectively provide performance isolation between virtual machines and the fair distribution of resources.

The storage system 10000 may be implemented as a server, a personal computer, a laptop computer, a mobile phone, a smart phone, a tablet person computer (tablet PC), or a wearable computer. The storage system 10000 may be implemented in a system-on-chip. In this case, the non-volatile memory 11000 may be implemented as a separate chip, and the separate non-volatile memory 11000 may be assembled by one package in the system-on-chip.

It is shown in FIG. 11 that the storage device 11000 is provided with one non-volatile memory 11100, but exemplary embodiments are not limited thereto. For example, the storage device 11000 of FIG. 11 may include a plurality of flash memories, non-volatile memories different from the flash memories, and any combinations thereof. In the storage device 11000, the memory controller 11200 and the non-volatile memory 11100 may be implemented in the form of one package. The storage device 11000 as shown in FIG. 11, as described above, may support virtual functions.

Figure 12:
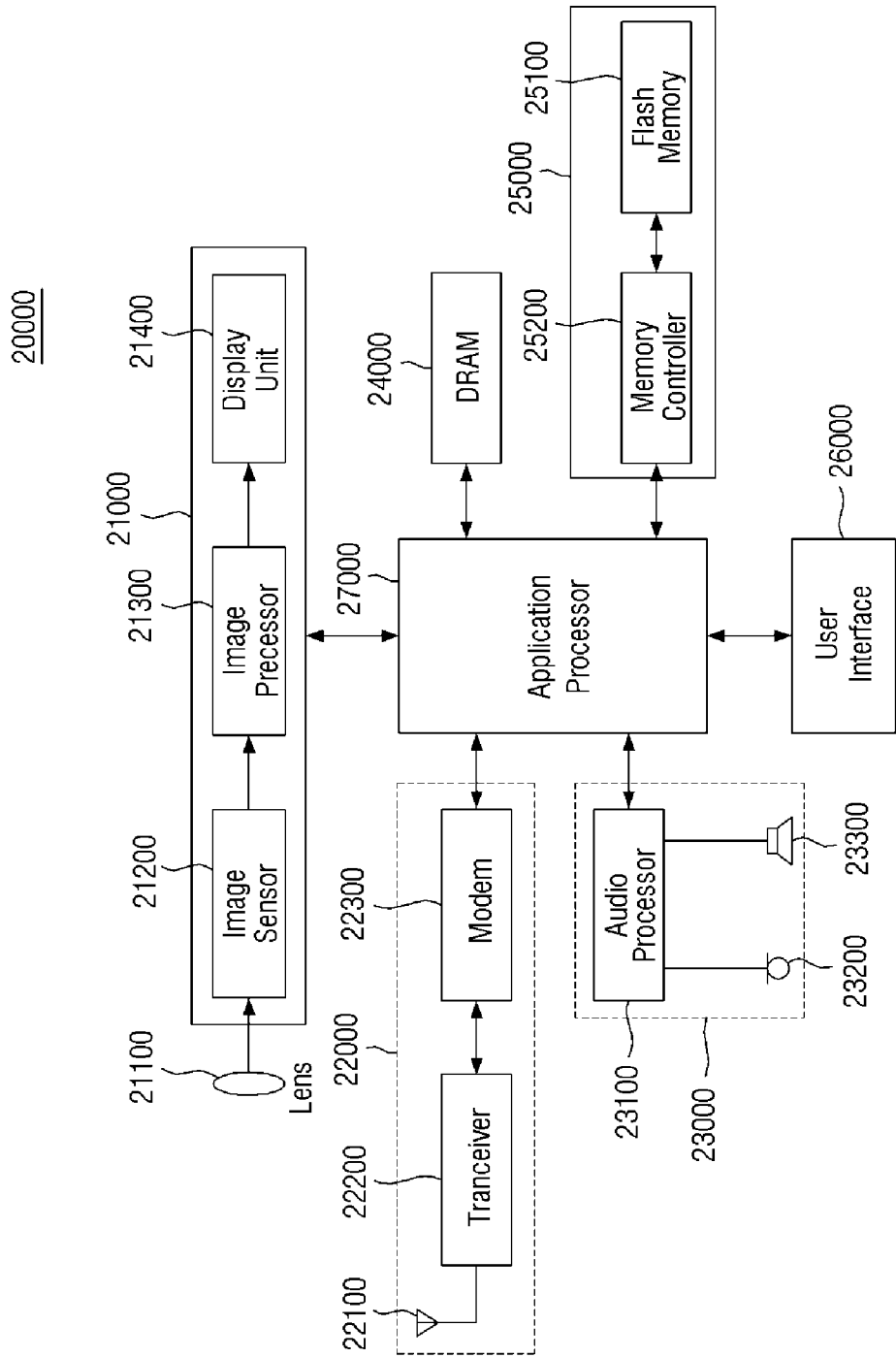
FIG. 12 is a block diagram of a computer system, to which the storage device according to an exemplary embodiment is applied.

FIG. 12 is a block diagram showing a computer system, to which a storage device according to an exemplary embodiment is applied.

Referring to FIG. 12, a computer system 20000 may include an image processing unit (or image processor) 21000, a wireless transceiving unit (or wireless transceiver) 22000, an audio processing unit (or audio processor) 23000, a memory 24000, a storage device 25000, a user interface 26000, and an application processor 27000.

The image processing unit 21000 may include a lens 21100, an image sensor 21200, an image processor 213000, and a display unit (or display) 21400. The wireless transceiving unit 22000 may include an antenna 22100, a transceiver (RF) 22200, and a modem 22300. The audio processing unit 23000 may include an audio processor 23100, a microphone 23200, and a speaker 23300. The memory 24000 may temporarily store the data processed in the computer system 20000. Further, the memory 24000 may correspond to the memory of FIG. 11. The storage device 25000 may be provided as a storage module (for example, an NVMe, an embedded multimedia card (eMMC), or the like). The storage device 25000 may correspond to the storage device 11000 of FIG. 11.

The application processor 27000 may be provided as a system-on-chip (SoC) that drives an application program and an operating system. The kernel of the operating system driven in the system-on-chip (SoC) may include a device driver that controls an input/output scheduler (I/O scheduler) and the storage device 25000. The device driver may control the access performance of the storage device 25000 or may control a CPU mode or a dynamic voltage and frequency scaling (DVFS) level in the SoC with reference to the number of synchronous queues managed in the input/output scheduler.

The application processor 27000, as shown in FIG. 11, may include a storage interface to support queue based interface mode and virtual functions.

The non-volatile memory 25100 and the memory controller 25200 may be mounted using various types of packages. For example, the non-volatile memory 25100 and the memory controller 25200 may be mounted using packages, such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), and Wafer-Level Processed Stack Package (WSP).

The computer system 20000 according to exemplary embodiments, as described above, allows the storage device 25000 to support virtual functions, to more effectively provide performance isolation between virtual machines and the fair distribution of resources.

The computer system 20000 may be implemented as a server, a personal computer, a laptop computer, a mobile phone, a smart phone, a tablet person computer (tablet PC), or a wearable computer. The application processor 27000 may be implemented in a system-on-chip. In this case, each of the memory controller 25200 and the non-volatile memory 25100 may be implemented as a separate chip, and the application processor 2700 and the storage device 25000 may be assembled by one package.

The computer system 20000 according to exemplary embodiments, as described above, may include the non-volatile memory 25100 including an independent erase block group corresponding to each of a plurality of virtual machines and the memory controller 25200 scheduling the request tasks of the plurality of virtual machines based on workload contribution of the plurality of virtual machines. The computer system 20000 may include the application processor 27000. The application processor 27000, as shown in FIG. 11, may include the storage interface 16000 that interfaces with the memory controller 25200 controlling the non-volatile memory 25100. Further, the computer system 20000 may further include the memory 24000 that stores the command and/or data transmitted to the storage device 25000.

As described above, according to the storage device and the method of operating the storage device of exemplary embodiments, a queue-based interface mode and virtual functions may be efficiently supported, the performance isolation between virtual machines may be improved, operation speed may be increased, and the processability of resource usage may be improved.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in exemplary embodiments without departing from the principles and spirit of the disclosure, the scope of which is defined in the claims and their equivalents.

What is claimed is:

1. A storage device comprising:
    a non-volatile memory comprising a plurality of blocks; and
    a storage controller connected to the non-volatile memory and configured to schedule requested tasks of a plurality of virtual machines based on a workload contribution of each virtual machine,
    wherein the storage controller is further configured to independently assign erase block groups to the non-volatile memory, and the workload contribution of each virtual machine is determined based on a storage efficiency of storing valid data in an erase block group corresponding to each virtual machine.

2. The storage device of claim 1,
    wherein the storage efficiency of storing the valid data is determined based on a ratio between a number of used pages and a number of pages in which the valid data are stored, with respect to the erase block group corresponding to each virtual machine.

3. The storage device of claim 1,
    wherein the storage controller comprises:
        a plurality of request queues respectively corresponding to the plurality of virtual machines and configured to store the requested tasks of the plurality of virtual machines;
        a task scheduler configured to schedule the requested tasks based on the workload contribution of each virtual machine;
        an address mapping manager configured to manage address mapping of data stored in the non-volatile memory; and
        a plurality of flash queues respectively connected to the non-volatile memory through a plurality of channels.

4. A task scheduling method of a storage device, the storage device comprising a storage controller and a non-volatile memory connected to the storage controller, the task scheduling method comprising:
    assigning a request queue to one of a plurality of virtual machines;
    assigning a time budget to the request queue;
    storing tasks, requested by the one of the plurality of virtual machines, in the request queue;
    executing a first task stored in the request queue;
    reducing the time budget by a time cost of the executed first task in response to execution of the first task being completed, the time cost being determined based on a workload generated by the first task; and
    in response to the time budget of the request queue being exhausted, delaying executing a remaining task stored in the request queue until a second time budget is reassigned to the request queue.

5. The task scheduling method of claim 4,
    wherein the assigning the time budget comprises assigning the same time budget to request queues respectively assigned to the plurality of virtual machines.

6. The task scheduling method of claim 4,
    wherein the executing the first task stored in the request queue comprises fetching the first task from the request queue.

7. The task scheduling method of claim 6,
    wherein the executing the first task stored in the request queue comprises receiving data associated with the first task from a host device and transmitting the received data to a flash queue included in the storage controller.

8. The task scheduling method of claim 7,
    wherein the transmitting comprises transmitting the received data to the flash queue through a plurality of channels between the storage controller and the non-volatile memory.

9. The task scheduling method of claim 4, further comprising:
    determining the time cost of the executed first task based on a time interval from fetching the first task stored in the request queue to completion of the first task.

10. The task scheduling method of claim 4, further comprising:
    independently assigning an erase block group comprising at least one block included in the non-volatile memory, to each of the plurality of virtual machines.

11. The task scheduling method of claim 10,
    wherein the time cost is determined based on a storage efficiency of storing data in the erase block group assigned to a corresponding virtual machine.

12. The task scheduling method of claim 11,
    wherein the storage efficiency is determined based on a ratio between a number of used pages and a number of pages in which valid data are stored, with respect to the erase block group.

13. The task scheduling method of claim 12,
    wherein the storage efficiency of the erase block group is stored in a meta block group included in the non-volatile memory.

14. The task scheduling method of claim 12,
    wherein the storage efficiency of the erase block group is stored in the erase block group.

15. The task scheduling method of claim 4, further comprising:
    compensating the time cost of the executed first task.

16. The task scheduling method of claim 15,
    wherein the compensating the time cost comprises:
        determining a time cost of an overhead; and compensating the time cost of the executed first task based on the determined time cost of the overhead.

17. The task scheduling method of claim 16, wherein the overhead comprises an overhead caused by at least one of garbage collection, read reclaim, and mapping table upload.

* * * * *